US007354616B2

(12) United States Patent
Porter

(10) Patent No.: US 7,354,616 B2
(45) Date of Patent: *Apr. 8, 2008

(54) MODIFIED OILSEED MATERIAL WITH A HIGH GEL STRENGTH

(75) Inventor: Michael A. Porter, Maple Grove, MN (US)

(73) Assignee: Solae, LLC, St. Louis, MO (US)

( * ) Notice: Subject to any disclaimer, the term of this patent is extended or adjusted under 35 U.S.C. 154(b) by 123 days.

This patent is subject to a terminal disclaimer.

(21) Appl. No.: 10/722,359

(22) Filed: Nov. 25, 2003

(65) Prior Publication Data
US 2005/0112254 A1 May 26, 2005

(51) Int. Cl.
*A23J 1/14* (2006.01)
(52) U.S. Cl. ............... 426/656; 426/634; 426/574; 426/589
(58) Field of Classification Search ............. 426/656, 426/634, 574, 589
See application file for complete search history.

(56) References Cited

U.S. PATENT DOCUMENTS

| | | |
|---|---|---|
| 3,586,662 A | 6/1971 | O'Connor |
| 3,622,556 A | 11/1971 | O'Connor |
| 3,728,327 A | 4/1973 | Frazeur et al. |
| 3,736,147 A | 5/1973 | Iacobucci et al. |
| 3,880,755 A | 4/1975 | Thomas et al. |
| 3,896,241 A | 7/1975 | Malaspina et al. |
| 3,958,015 A | 5/1976 | Gay |
| 3,993,636 A | 11/1976 | Maubois et al. |
| 3,995,071 A | 11/1976 | Goodnight, Jr. et al. |
| 4,018,752 A | 4/1977 | Bühler et al. |
| 4,028,468 A | 6/1977 | Hohner et al. |
| 4,069,103 A | 1/1978 | Müller |
| 4,072,670 A | 2/1978 | Goodnight, Jr. et al. |
| 4,075,361 A | 2/1978 | Oberg |
| 4,088,795 A | 5/1978 | Goodnight, Jr. et al. |
| 4,091,120 A | 5/1978 | Goodnight, Jr. et al. |
| 4,125,527 A | 11/1978 | Buhler et al. |
| 4,147,745 A | 4/1979 | Sano et al. |
| 4,163,010 A | 7/1979 | Garbutt |
| 4,252,652 A | 2/1981 | Elfert et al. |
| 4,256,652 A | 3/1981 | Kidani et al. |
| 4,293,571 A | 10/1981 | Olofsson et al. |
| 4,324,805 A | 4/1982 | Olsen |
| 4,332,719 A | 6/1982 | Lawhon et al. |
| 4,420,425 A | 12/1983 | Lawhon |
| 4,501,694 A * | 2/1985 | Hirotsuka et al. ......... 530/378 |
| 4,624,805 A | 11/1986 | Lawhon |
| 4,697,004 A | 9/1987 | Puski et al. |
| 4,787,976 A | 11/1988 | Parham et al. |
| 4,889,921 A | 12/1989 | Diosady et al. |
| 4,897,465 A | 1/1990 | Cordle et al. |
| 4,906,379 A | 3/1990 | Hodgins et al. |
| 4,943,373 A | 7/1990 | Onishi et al. |
| 4,943,374 A | 7/1990 | Heininger et al. |
| 5,000,848 A | 3/1991 | Hodgins et al. |
| 5,039,420 A | 8/1991 | Klein et al. |
| 5,086,166 A | 2/1992 | Lawhon et al. |
| 5,290,448 A | 3/1994 | Sluma et al. |
| 5,456,843 A | 10/1995 | Koenhen |
| 5,476,590 A | 12/1995 | Brose et al. |
| 5,503,746 A | 4/1996 | Gagnon |
| 5,554,292 A | 9/1996 | Maeda et al. |
| 5,658,714 A | 8/1997 | Westfall et al. |
| 5,707,522 A | 1/1998 | Maeda et al. |
| 5,760,182 A | 6/1998 | Adachi et al. |
| 5,939,182 A | 8/1999 | Huang et al. |
| 6,056,903 A | 5/2000 | Greenwood et al. |
| 6,159,715 A * | 12/2000 | Porter et al. ............. 435/170 |
| 6,423,364 B1 * | 7/2002 | Altemueller et al. ...... 426/634 |
| 6,465,037 B1 * | 10/2002 | Altemueller et al. ...... 426/634 |
| 6,599,556 B2 * | 7/2003 | Stark et al. .............. 426/656 |
| 6,630,195 B1 * | 10/2003 | Muralidhara et al. ..... 426/656 |
| 6,797,288 B2 * | 9/2004 | Monagle et al. .......... 424/757 |
| 6,830,773 B2 * | 12/2004 | Porter et al. ............. 426/644 |
| 6,841,184 B2 * | 1/2005 | Porter et al. ............. 426/589 |

FOREIGN PATENT DOCUMENTS

| | | |
|---|---|---|
| GB | 1 540 376 | 2/1979 |
| GB | 1 580 051 | 11/1980 |
| WO | WO 98/12209 | 3/1998 |
| WO | WO 02080697 | * 10/2002 |
| WO | WO 02/100186 A2 | 12/2002 |

OTHER PUBLICATIONS

International Search Report for PCT/US01/43304 dated Dec. 19, 2002 (2 pages).

(Continued)

*Primary Examiner*—Anthony Weier
(74) *Attorney, Agent, or Firm*—James L. Cordek; Holly M. Amjad

(57) ABSTRACT

Modified oilseed material with a high gel strength is described. The modified oilseed material can be utilized in a variety of nutritional applications, including the preparation of protein supplemented food products such as processed meat products. The modified oilseed material typically includes at least 85 wt. % protein (dry solids basis) and has excellent functional properties. For example, the modified oilseed material can include at least about 40 wt. % of the protein has an apparent molecular weight of greater than 300 kDa, a gel breaking strength of at least 0.50 N, and/or the protein has a $MW_{50}$ of at least about 200 kDa.

21 Claims, No Drawings

OTHER PUBLICATIONS

Cheryan, "Mass Transfer Characteristics of Hollow Fiber Ultrafiltration of Soy Protein Systems," *J. Food Proc. Eng.*, 1, pp. 269-287 (1977).

Gould et al., "A Practical Approach to Controlling the Fouling of Ultrafiltration Membranes: A Case Study of the Successful Development of a Commercial Soy Protein Application," available @ http://www.osmonics.com/products/Page823.htm (available at least by Dec. 3, 1999).

Lawhon et al., "Processing Whey-Type By-Product Liquids from Cottonseed Protein Isolation with Ultrafiltration and Reverse Osmosis Membranes," *J. Food Proc. Eng.*, 1, pp. 15-35 (1977).

Lawhon et al., "Production of Protein Isolates and Concentrates from Oilseed Flour Extracts using Industrial Ultrafiltration and Reverse Osmosis Systems," *Journal of Food Science*, 42, pp. 389-394 (1977).

Lawhon et al., "Optimization of Protein Isolate Production from Soy Flour Using Industrial Membrane Systems," *Journal of Food Science*, 43, pp. 361-369 (1978).

Lawhon et al., "Alternate Processes for Use in Soy Protein Isolation by Industrial Ultrafiltration Membranes," *Journal of Food Science*, 44, pp. 213-219 (1979).

Lawhon et al., "Soy Protein Ingreedients Prepared by New Processes-Aqueous Processing and Industrial Membrane Isolation," *Journal of the American Oil Chemists' Society*, 58, pp. 377-383 (Mar. 1981).

Lawhon et al., "Production of Oil and Protein Food Products from Raw Peanuts by Aqueous Extraction and Ultrafiltration," *Journal of Food Science*, 46, pp. 391-395 (1981).

Lawhon et al., "Combining Aqueous Extraction and Membrane Isolation Techniques to Recover Protein and Oil from Soybeans," *Journal of Food Science*, 46, pp. 912-916 (1981).

Lawhon et al., "New Techniques in Membrane Processing of Oilseeds," *Food Technology*, 38, pp. 97-106 (1984).

Nichols et al., "Production of Soy Isolates by Ultrafiltration: Factors Affecting Yield and Composition," *J. Food Sci.*, 46, pp. 367-372 (1981).

Okubo et al., "Preparation of Low-Phytate Soybean Protein Isolate and Concentrate by Ultrafiltration," *Cereal Chemistry*, 52, pp. 263-271 (1975).

Omosaiye et al., "Removal of Oligosaccharides from Soybean Water Extracts by Ultrafiltration," *J. Food Sci.*, 43, pp. 354-360 (1978).

Omosaiye et al., "Ultrafiltration of Soybean Water Extracts: Processing Characteristics and Yields," *J. Food Sci.*, 44, pp. 1027-1031 (1979).

Omosaiye et al., "Low-Phytate, Full-Fat Soy Protein Product by Ultrafiltration of Aqueous Extracts of Whole Soybeans," *Cereal Chem.*, 56, pp. 58-62 (1979).

Osmonics, "Osmonics® Ultrafilic® M-Series Membrane Engineered to be 'Fouling-Free,'" available @ http://www.osmonics.com/scripts/PressTmpl.asp?PressRelID=307 (dated Oct. 4, 1999).

Osmonics, "UltraFilic Membranes," available @ http://www.osmonics.com/products/Page918.htm (available at least by Nov. 15, 2000).

Porter et al., "Membrane ultrafiltration," *Chem. Tech.*, pp. 56-63 (Jan. 1971).

S. K. Sayed Razavi, J. L. Harris, F. Sherkat, "Fouling and cleaning of membranes in the ultrafiltration of the aqueous extract of soy flour," *Journal Of Membrane Science*, 114 (1996), pp. 93-104.

Torok, "The Filtration Spectrum," available @ http://www.osmonics.com/products/Page710.htm (Published in "Filtration News" on May 1, 1994).

United Soybean Board, "Soy Protein Isolate" available @ http://www.talksoy.com/isolate.htm (available at least by Sep. 6, 2000).

\* cited by examiner

MODIFIED OILSEED MATERIAL WITH A HIGH GEL STRENGTH

BACKGROUND

Modified oilseed materials are used as food additives for enhancing texture and other functional characteristics of various food products as well as a source of protein. The use of modified oilseed materials such as modified soybean materials may be limited in some instances, however, due to their flavor and/or color characteristics. It is still unclear exactly which components are responsible for the flavor and color characteristics of oilseeds, though a variety of compounds are suspected of causing these characteristics. Among these are aliphatic carbonyls, phenolics, volatile fatty acids and amines, esters and alcohols.

There are extensive reports of processes used for the isolation, purification and improvement of the nutritional quality and flavor of oilseed materials, particularly soybean materials. Soybean protein in its native state is unpalatable and has impaired nutritional quality due to the presence of phytic acid complexes which interfere with mammalian mineral absorption, and the presence of antinutritional factors which interfere with protein digestion in mammals. The reported methods include the destruction of the trypsin inhibitors by heat treatment as well as methods for the removal of phytic acid. A wide variety of attempts to improve the yield of protein secured as purified isolate relative to that contained in the soybean raw material have also been described.

Many processes for improving soy protein flavor involve the application of heat, toasting, alcohol extraction and/or enzyme modification. These types of processes often result in substantial protein denaturation and modification, thereby substantially altering the product's functionality. In addition, these processes can promote interactions between proteins with lipid and carbohydrate constituents and their decomposition products. These types of reactions can reduce the utility of soy proteins in food products, especially in those that require highly soluble and functional proteins, as in dairy foods and beverages.

Commercial soy protein concentrates, which are defined as soy protein products having at least 70% by weight protein (dry solids basis or "dsb"), are generally produced by removing soluble sugars, ash and some minor constituents. The sugars are commonly removed by extracting with: (1) aqueous alcohol; (2) dilute aqueous acid; or (3) water, after first insolubilizing the protein with moist heating. These processes generally produce soy protein products with a distinctive taste and color.

Soy protein isolates are defined as products having at least 90% by weight protein (dsb). Commercial processes for producing soy protein isolates are generally based on acid precipitation of protein. Methods of producing soy protein isolates often include (1) extracting the protein from soy flakes with water at an alkaline pH and removing solids from the liquid extract; (2) subjecting the liquid extract to isoelectric precipitation by adjusting the pH of the liquid extract to the point of minimum protein solubility to obtain the maximum amount of protein precipitate; and (3) separating precipitated protein curd from by-product liquid whey. This type of process, however, still tends to produce a protein product with a distinctive taste and color.

A number of examples of processes for producing concentrated soy protein products using membrane filtration technology have been reported. Due to a number of factors including cost, efficiency and/or product characteristics, however, membrane-based purification approaches have not experienced widespread adoption as commercial processes. Such processes may suffer from one or more disadvantages, such as reduced functional characteristics in the resulting protein product and/or the production of a product which has an "off" flavor and/or an off-color such as a dark cream to light tan color. Membrane-based processes can also be difficult to operate under commercial production conditions due to problems associated with bacterial contamination and fouling of the membranes. Bacterial contamination can have undesirable consequences for the flavor of the product.

SUMMARY

A modified oilseed material having a high gel strength is described herein. The modified oilseed material may suitably be derived from oilseed material, such as defatted soybean white flakes or soybean meal, and suitably exhibits desirable flavor and/or color characteristics. The high gel strength material is generally suitable for use as a protein source for incorporation into foods for human and/or animal consumption (e.g., to produce protein supplemented food products). The high gel strength material can be particularly suitable for use as a protein source in processed meat, meat analog, sauce or soup systems.

The modified oilseed material with a high gel strength can be produced by a membrane-based purification process which typically includes an extraction step to solubilize proteinaceous material present in an oilseed material. The extraction step may include a fast extraction method wherein 40 to 60 percent of the proteinaceous material is dissolved into an aqueous solvent in about 3 minutes of extraction. In some instances, it may be desirable to conduct the extraction as a continuous, multi-stage process (e.g., a multistage countercurrent extraction). A suitable multi-stage extraction process can include operating an initial stage with an aqueous solution having a pH different than the pH of an aqueous solution used to extract the partially extracted solids in a subsequent operation. Suitably, the difference in pH between subsequent extraction is no more than 2.5 (e.g., the oilseed material is extracted in an initial stage with an aqueous solution having a substantially neutral pH and the partially extracted solids are extracted a second time with an aqueous alkaline solution). In one suitable embodiment, the oilseed material is extracted in an initial stage with an aqueous solution having a pH of 6.5 to 7.5 and the partially extracted solids are extracted a second time with an aqueous solution having a pH of 8.0 to 8.5.

The modified oilseed material with a high gel strength can commonly be produced by a process which includes an extraction step to solubilize proteinaceous material present in an oilseed material. The extract containing the dissolved protein is commonly adjusted to a pH of 7.0 to 7.8 then maintained at this pH during membrane processing. The process uses one or more microporous membranes to separate and concentrate protein from the extract. It is generally advantageous to use a microporous membrane which has a filter surface with a relatively low contact angle, e.g., no more than about 40 degrees. The process commonly utilizes either relatively large pore ultrafiltration membranes (e.g., membranes with a molecular weight cut-off ("MWCO") of about 25,000 to 500,000) or microfiltration membranes with pore sizes up to about 1.5μ. When microfiltration membranes are employed, those with pore sizes of no more than about 1.0μ and, more desirably, no more than about 0.5μ are particularly suitable. Herein, the term "microporous membrane" is used to refer to ultrafiltration membranes and microfiltration membranes collectively. By employing such relatively large pore membranes, the membrane filtration operation in the present process can be carried out using transmembrane pressures of no more than about 100 psig, desirably no more than about 50 psig, and often in the range of about 10-20 psig.

The modified oilseed material with a high gel strength can commonly be produced by a process that includes an ultra-high temperature (UHT) treatment for a short time to pasteurize the material. The pH is commonly maintained at about 7.0 to 7.8 throughout the UHT treatment. The UHT treatment may include pumping the retentate to a steam injector, where the retentate is mixed with steam and heated to at least about 200° F. for a short period of time, e.g., generally for about 5 to 20 seconds. The product is flash cooled to about 130° F. The product of the UHT treatment may be spray dried at a pH of about 7.0 to 7.8 to yield a modified oilseed material with a high gel strength.

A particularly desirable modified oilseed material with a high gel strength can commonly be produced by a process that includes a UHT treatment where the pH is commonly maintained at about 7.1 to 7.7 throughout the UHT treatment. The UHT treatment commonly includes heating the material to about 200-250° F. for about 9 to 15 seconds. The product of the UHT treatment is typically flash cooled and spray dried to yield a modified oilseed material.

A particularly desirable modified oilseed material with a high gel strength can commonly be produced by a process that includes a UHT treatment where the pH is commonly maintained at about 7.2 to 7.4 throughout the UHT treatment. The UHT treatment commonly includes heating the material to about 210° F. for about 9 to 15 seconds. The product of the UHT treatment is typically flash cooled and spray dried to yield a modified oilseed material.

The modified oilseed material with a high gel strength can have a variety of characteristics that make it particularly suitable for use as a protein source for incorporation into food products, particularly processed meat systems. A suitable modified oilseed material may include at least about 85 wt. % (dsb) protein, preferably at least about 90 wt. % (dsb) protein, a gel breaking strength of at least about 0.50 N; and have one or more of the following characteristics: a $MW_{50}$ of at least about 200 kDa; at least about 40% of the protein has an apparent molecular weight of greater than 300 kDa; an ESI of no more than about 70 mm; and a solids profile of no more than about 11.00%.

A suitable modified oilseed material may also have one or more of the following characteristics: an NSI of at least about 80; 1.4% cysteine as a percentage of total protein; a Gardner L value of at least about 85; a substantially bland taste; a dispersion viscosity of at least about 0.30 $Nsm^{-2}$; a final viscosity of at least about 0.50 $Nsm^{-2}$ after a heating and cooling cycle (as described in Example 5 herein); and a final viscosity of at least about 0.45 $Nsm^{-2}$ after a heating and cooling cycle in the presence of NaCl (as described in Example 6 herein).

The present methods can also be used to produce modified oilseed material having a ratio of sodium ions to a total amount of sodium, calcium and potassium ions of no more than 0.5; no more than about 7000 mg/kg (dsb) sodium ions; and a bacteria load of no more than about 50,000 cfu/g; and a flavor component content which includes no more than about 2500 ppb 2-pentyl furan, 600 ppb 2-heptanone, 250 ppb E,E-2,4-decadienal, and/or 500 ppb benzaldehyde.

A particularly desirable modified oilseed material formed by the present method which may be used to produce a protein supplemented food product may have one or more of the following characteristics: a $MW_{50}$ of at least about 400 kDa; at least about 60% of the protein has an apparent molecular weight of greater than 300 kDa; a gel breaking strength of at least about 0.60 N; an ESI of no more than about 60 mm; and a solids profile of no more than about 10.75%.

A particularly desirable modified oilseed material may also have one or more of the following characteristics: a dispersion viscosity of at least about 0.40 $Nsm^{-2}$; a final viscosity of at least about 0.60 $Nsm^{-2}$ after a heating and cooling cycle; a final viscosity of at least about 0.46 $Nsm^{-2}$ after a heating and cooling cycle in the presence of NaCl.

Certain embodiments of the present modified oilseed material can have a flavor component content which includes no more than about 2500 ppb 2-pentyl furan, 450 ppb 2-heptanone, 150 ppb E,E-2,4-decadienal, 350 ppb benzaldehyde, and/or 50 ppb E,E-2,4-nonadienal.

DETAILED DESCRIPTION

A modified oilseed material having a high gel strength that is suitable for incorporation into foods for human and/or animal consumption is described herein. The modified oilseed material is particularly suitable for incorporation into processed meat systems.

The modified oilseed material generally has a high protein content as well as a high gel strength and may be capable of forming viscous dispersions. Typically, the dispersions may be made more viscous by a heating and cooling cycle. The modified oilseed material may also form dispersions that increased in viscosity when heated in the presence of salt. The modified oilseed material commonly forms thermally stable emulsions. The modified oilseed material can have a variety of other characteristics that make it suitable for use as a protein source for incorporation into foods for human and/or animal consumption.

The modified oilseed material can commonly be produced by a process which includes an extraction step to solubilize proteinaceous material present in an oilseed material and a subsequent purification of the extract using one or more microporous membranes to remove significant amounts of carbohydrates, salts and other non-protein components. Very often, the extract is clarified prior to membrane purification by at least removing a substantial amount of the particulate material present in the suspension produced by the extraction procedure. The clarified extract's pH is adjusted to a pH of about 7.0 to 7.8 (suitably to about 7.1 to 7.7, more suitably to about 7.2 to 7.4, preferably at about 7.3), and maintained at 7.0 to 7.8 during processing with the membranes.

The process described herein uses one or more microporous membranes to separate and concentrate protein from an oilseed extract. It is generally advantageous to use a microporous membrane which has a filter surface with a relatively low contact angle, e.g., no more than about 40 degrees. Microporous membranes with even lower contact angles, e.g., with filter surfaces having a contact angle of no more than about 30 degrees and in some instances of no more than about 15 degrees, are particularly suitable for use in the present method. The process commonly utilizes either relatively large pore ultrafiltration membranes (e.g., membranes with a molecular weight cut-off ("MWCO") of at least about 30,000) or microfiltration membranes with pore sizes up to about 2μ.

The process described herein generally includes an ultra-high temperature (UHT) treatment for a short time to pasteurize the retentate. Preferably, solution pH is maintained at about 7.0 to 7.8, suitably at about 7.1 to 7.7, more suitably at about 7.2 to 7.4, preferably at about 7.3, throughout the UHT treatment and drying process. The UHT treatment typically includes pumping the retentate to a steam injector, e.g., where the retentate is mixed with steam and heated to about 200-250° F. for about 5 to 20 seconds, suitably to about 205-240° F. for about 9 to 15 seconds, more suitably to about 210-215° F. for about 9 to 15 seconds. The product is generally flashed cooled to about 130° F. The product of the UHT treatment is generally spray dried to yield a modified oilseed material with a high gel strength.

Source of Oilseed Material

The starting oilseed material employed in the present method generally includes material derived from defatted oilseed material, although other forms of oilseed based material may be employed. The fat may be substantially removed from dehusked oilseeds by a number of different methods, e.g., by simply pressing the dehusked seeds or by extracting the dehusked seeds with an organic solvent, such as hexane. The defatted oilseed material which is employed in preferred embodiments of the present process typically contains no more than about 3 wt. % and, preferably, no more than about 1 wt. % fat. The solvent extraction process is typically conducted on dehusked oilseeds that have been flattened into flakes. The product of such an extraction is referred to as an oilseed "white flake." For example, soybean white flake is generally obtained by pressing dehusked soybeans into a flat flake and removing a substantial portion of the residual oil content from the flakes by extraction with hexane. The residual solvent can be removed from the resulting white flake by a number of methods. In one procedure, the solvent is extracted by passing the oilseed white flake through a chamber containing hot solvent vapor. Residual hexane can then be removed from soybean white flakes by passage through a chamber containing hexane vapor at a temperature of at least about 75° C. Under such conditions, the bulk of the residual hexane is volatilized from the flakes and can subsequently be removed, e.g., via vacuum. The material produced by this procedure is referred to as flash desolventized oilseed white flake. The flash desolventized oilseed white flake is then typically ground to produce a granular material (meal). If desired, however, the flash desolventized oilseed white flake may be used directly in the present method.

Another defatted oilseed derived material which is suitable for use in the present process is derived from material obtained by removing the hexane from the oilseed white flake by a process referred to as toasting. In this process, the hexane extracted oilseed white flakes are passed through a chamber containing steam at a temperature of at least about 105° C. This causes the solvent in the flakes to volatilize and be carried away with the steam. The resulting product is referred to as toasted oilseed flake. As with flash desolventized oilseed white flake, toasted oilseed flake may be used directly in the present method or may be ground into a granular material prior to extraction.

While the desolventized oilseed white flake may be used directly in the extraction step, more commonly the desolventized flake is ground to a meal prior to being employed as starting material for the extraction. Oilseed meals of this type, such as soybean meal, are used in a wide variety of other applications and are readily available from commercial sources. Other examples of oilseed materials which are suitable for use in the culture medium include canola meal, sunflower meal, cottonseed meal, peanut meal, lupin meal and mixtures thereof. Oilseed materials derived from defatted soybean and/or defatted cottonseed are particularly suitable for use in the present method since such materials have a relatively high protein content. It is important to note that although many of the examples and descriptions herein are applied to a modified soybean material, the present method and material should not be construed to be so limited, and may be applied to other grains and oilseeds.

Extraction of Oilseed Material

The extraction of the protein fraction from oilseed material can be carried out under a variety of conditions using conventional equipment. Among the factors which affect the choice of process parameters and equipment are the efficiency of the extraction, effects on the quality of the protein in the extract and minimization of the environmental impact of the process. For cost and environmental reasons, one often would like to reduce the volume of water used in the process. The process parameters are also generally selected so as to minimize the degradation of protein, e.g., via indigenous enzymes and/or chemical reactions, as well as to avoid substantial bacterial contamination of the extract.

A variety of reactor configurations including stirred tank reactors, fluidized bed reactors, packed bed reactors may be employed in the extraction step. For example, the entire extraction reaction may be performed in a single vessel having appropriate mechanisms to control the temperature and mixing of the medium. Alternatively, the extraction may be carried out in multiple stages performed in separate reaction vessels (see, e.g., the process system illustrated in FIG. 1). For example, the extraction may also be carried out as a continuous, multistage process (e.g., a countercurrent extraction including two or more stages). In another embodiment, at least one stage of the extraction may be carried out under conditions that minimize the contact time between solid oilseed and the extraction solvent. In another embodiment involving relatively short extractions times, the oilseed material may be sprayed with a warm (e.g., 55° C. to 75° C.) aqueous solution as it is being introduced to a solid/liquid separation device. Such systems can have extraction times of 5 to 30 seconds. For example, aqueous solutions and oilseed material may be co-injected into a screw extruder and passed immediately into a solid/liquid separation device (e.g., a decanter, centrifuge, etc.). In such a system, the solid and liquid phases may only be in contact for a period of one minute or less, depending on the configuration of the system.

As is common with many processes, the optimization of the various objectives typically requires a balancing in the choice of process parameters. For example, in order to avoid substantial chemical degradation of the protein, the extraction may be run at a relatively low temperature, e.g., about 15° C. to 40° C. and preferably about 20° C. to 35° C. Such temperatures, however, may be conducive to bacterial growth so that it may be best to minimize extraction times and/or conduct subsequent process operations at sufficiently high temperatures to reduce bacterial growth.

Oilseed materials can be extracted under both acidic and basic conditions to obtain their proteinaceous material. The present method typically includes an extraction using a solution having a pH of about 6.5 to about 10. More suitably, the method includes an extraction under neutral to basic conditions, e.g., using an alkaline solution having a pH of about 7 to about 9. The extraction may be conducted by contacting the oilseed material with an aqueous solution containing a set amount of base, such as sodium hydroxide, potassium hydroxide, ammonium hydroxide and/or calcium hydroxide, and allowing the pH to slowly decrease as the base is neutralized by substances extracted out of the solid oilseed material. The initial amount of base is typically chosen so that at the end of the extraction operation the extract has a desired pH value, e.g., a pH within the range of 7.0 to 8.5. Alternately, the pH of the aqueous phase can be monitored (continuously or at periodic time intervals) during the extraction and base can be added as needed to maintain the pH at a desired value or within a desired pH range.

When the extraction is carried out as a single stage operation, the spent oilseed material is generally washed at least once with water or alkaline solution to recover proteinaceous material which may have been entrained in the solids fraction. The washings may either be combined with the main extract for further processing or may be used in the extraction of a subsequent batch of oilseed material.

When the extraction is carried out in a multistage operation, the extraction parameters can be optimized for each stage. For example, in a multi-stage extraction, the pH during one stage may be higher or lower than the pH in a prior or subsequent. Suitably, the change in pH is no more than 1.5. In one suitable embodiment, the oilseed material is extracted in an initial stage with an aqueous solution having a pH of 7.0 to 7.5 and the partially extracted solids are extracted a second time with an aqueous solution having a pH of 8.0 to 8.5.

The extraction operation commonly produces a mixture of insoluble material in an aqueous phase which includes soluble proteinaceous material. The extract may be subjected directly to separation via membrane filtration. In most cases, however, the extract is first clarified by removing at least a portion of the particulate matter from the mixture to form a clarified extract. Commonly, the clarification operation removes a significant portion and, preferably, substantially all of the particulate material. Clarification of the extract can enhance the efficiency of the subsequent membrane filtration operation and help avoid fouling problems with the membranes used in that operation.

The clarification can be carried out via filtration and/or a related process (e.g., centrifugation) commonly employed to remove particulate materials from the aqueous suspensions. Decanter centrifuges are commonly used to separate liquid phases from aqueous oilseed slurries. It may be advantageous to further clarify the extract e.g. through the use of a desludging centrifuge before subjecting the extract to membrane filtration. Such processes do not, however, generally remove much of the soluble materials and thus the solubilized protein remains in the aqueous phase for further purification via membrane filtration. Because of the desire to achieve a high overall protein yield, the clarification step typically does not make use of filtration aids such as flocculents which could adsorb soluble proteinaceous material.

As depicted in FIG. 1, one suitable method of conducting the extraction and clarification operations employs a series of extraction tanks and decanter centrifuges to carry out a multi-stage counter current extraction process. This type of system permits highly efficient extractions to be carried out with a relatively low water to flake ratio. For example, this type of system can efficiently carry out extractions where the weight ratio of the aqueous extraction solution to the oilseed material in each phase is in the range of 6:1 to 10:1. Use of low water to flake ratios can enable the production of an oilseed extract which contains a relatively high concentration of dissolved solids, e.g., dissolved solids concentrations of 5 wt. % or higher and the production of extracts with at least about 7 wt. % solids is not uncommon. The use of low water to flake ratios and more concentrated extracts allows the process to be run in a system with lower volume capacity requirements, thereby decreasing demands on capital costs associated with the system.

If the system requirements in a particular instance do not include significant restrictions on overall volume, the extraction process may be carried out using higher water to flake ratios. Where relatively high water to flake ratios are employed in the extraction operation, e.g., ratios of 20:1 to 40:1, it may be more convenient to carry out the extraction in a single stage. While these types of water to flake ratios will require systems capable of handling larger volumes of fluids (per pound of starting oilseed material), the higher dilution factor in the protein extraction can decrease the potential for fouling the microporous membrane(s) used in the membrane filtration operation.

Membrane Filtration

Extract liquor is transferred from the extraction system to a membrane separation system, generally by first introducing clarified extract into a membrane feed tank. The extract liquor commonly contains about 4.0-5.0% soluble protein and about 1.5-2.0% dissolved non-protein material and has a pH near 7.0. The pH of the extract is adjusted to about 7.0 to 7.8 (suitably to about 7.1 to 7.7, more suitable to about 7.2 to 7.4) using any of a number of common alkaline materials, as described above. One purpose of the microfiltration operation is to separate protein from non-protein material. This can be accomplished by circulating the extract liquor through a set of microfiltration membranes. Water and the non-protein materials pass through the membrane as permeate while most of the protein is retained in the circulating stream ("retentate"). The pH of the retentate is maintained in the range of about 7.0 to 7.8 (suitably about 7.1 to 7.7, more suitable about 7.2 to 7.4). The protein-containing retentate is typically allowed to concentrate by about a 2.5-3× factor (e.g., concentration of 30 gallons of incoming crude extract by a 3× factor produces 10 gallons of retentate). The concentration factor can be conveniently monitored by measuring the volume of permeate passing through the membranes. Membrane concentration of the extract by a 3× factor generally produces a retentate stream with dissolved solids containing at least about 80 wt. % protein (dsb). In order to increase the protein concentration to 90 wt. %, two 1:1 diafiltrations are typically carried out. In a diafiltration operation, water is added to the concentrated retentate and then removed through the microporous membranes. This can be carried out in the manner described above or, in an alternate embodiment of the present method, the diafiltration can be carried out at the initial stage of the membrane filtration, e.g., by continuously adding water to the incoming extract in a feed tank so as to substantially maintain the original volume.

The membrane filtration operation typically produces a retentate which is concentrated by at least a 2.5× factor, i.e., passing a volume of the extract through the filtration system produces a protein-enriched retentate having a volume of no more than about 40% of the original extract volume. The output from the membrane filtration operation generally provides a protein-enriched retentate which includes at least about 10 wt. % protein, and protein concentrations of 12 to 14 wt. % are often readily attained.

For environmental and efficiency reasons, it is generally desirable to recover as much of the water from the membrane permeates as possible and recycle the recovered water back into the process. This decreases the overall hydraulic demand of the process as well as minimizing the volume of effluent discharged by the process. Typically, the diafiltration permeate is combined with the permeate from the concentration phase of the membrane filtration. The bulk of the water in the combined permeate can be recovered by separating the combined permeate with a reverse osmosis ("RO") membrane into an RO retentate and an RO permeate. RO separation can produce a permeate that is essentially pure water. This can be recycled back into earlier stages of the process. For example, the RO permeate can be used in an aqueous solution for extracting the oilseed material. The RO permeate can also be utilized in a diafiltration operation by diluting protein-enriched retentate with an aqueous diluent which includes the RO permeate.

The present process uses a membrane filtration system with one or more microporous membranes to separate and concentrate protein from the extract. It is generally advantageous to use a microporous membrane which has a filter surface with a relatively low contact angle, e.g., no more than about 40 degrees, as such membranes can provide efficient separation while exhibiting good resistance to fouling. Microporous membranes with even lower filter surface contact angles (i.e., surfaces having greater hydrophilicity) are particularly suitable for use in the present process. Such membranes may have a filter surface with a contact angle of 25 degrees or less and some membranes may have a filter surface contact angle of no more than about 10 degrees.

As used herein, the term "contact angle" refers to contact angles of surfaces measured using the Sessile Drop Method. This is an optical contact angle method used to estimate the wetting property of a localized region on a surface. The angle between the baseline of a drop of water (applied to a flat membrane surface using a syringe) and the tangent at the drop boundary is measured. An example of a suitable instrument for measuring contact angles is a model DSA 10 Drop Shape Analysis System commercially available from Kruss.

The membranes should be capable of retaining a high percentage of the medium and high molecular weight protein components present in the extract while allowing water and other components to pass through the membrane. The membrane filtration operation commonly utilizes either relatively large pore ultrafiltration membranes (e.g., membranes with a molecular weight cut-off ("MWCO") of at least about 30,000) or microfiltration membranes with pore sizes up to about 1.5μ. Low contact angle microfiltration membranes with MWCOs of 25,000 to 200,000 are particularly suitable for use in the present process. Particular examples of suitable microporous membranes in modified PAN membranes with a filter surface contact angle of no more than about 25 degrees and an MWCO of 30,000 to 100,000. To be useful in commercial versions of the process, the membranes should be capable of maintaining substantial permeation rates, e.g., allowing roughly 1500 to 3000 mL/min to pass through a membrane module containing circa 12 sq. meters of membrane surface area. By employing such relatively large pore microporous membranes, the membrane filtration operation can generally be carried out using membrane back pressures of no more than about 100 psig. More preferably the membrane back pressure is no more than about 50 psig and efficient membrane separation has been achieved with back pressures in the range of 10-20 psig.

The membrane filtration system is generally configured to run in a cross-flow filtration mode. Because larger particles and debris are typically removed by the earlier clarification operation, the microporous membrane tends not to become clogged easily. Inclusion of the clarification step upstream in the process tends to result in longer membrane life and higher flux rates through the membrane. The membrane filtration system typically employs one or more interchangeable membrane modules. This allows membrane pore size (or MWCO) and/or membrane type to be altered as needed and allows easy replacement of fouled membranes.

Cross-flow filtrations can be run either continuously or in batch mode. Cross-flow membrane filtration can be run in a variety of flow configurations. For example, a tubular configuration, in which the membranes are arranged longitudinally in tubes similar to the tubes in a shell and tube heat exchanger, is one common configuration since it allows processing of solutions which include a variety of particle sizes. A number of other conventional cross-flow configurations, e.g., flat sheet and spiral wound, are known to provide effective membrane separations while reducing fouling of the membrane. Spiral wound cross-flow membrane systems are particularly suitable for use in the present processes, especially where the feed solution contains relatively little particulate matter, such as a clarified oilseed extract. Spiral wound membrane modules tend to provide highly efficient separations and permit the design of filtration systems with large membrane surface areas in a relatively compact space.

As with the extraction operation, the temperature of the protein-containing solution during the membrane filtration operation can affect the chemical state of the protein (e.g., via degradation and/or denaturation) as well as the amount of bacterial contamination which occurs. Lower temperatures tend to minimize chemical degradation of the protein. However, at lower temperatures bacterial growth can be a problem and the viscosity of more concentrated protein solutions (e.g., solutions with at least about 10 wt. % protein) can present processing problems. The present inventors have found that maintaining the protein-containing extract at about 55 to 65° C. while conducting the membrane separation can effectively suppress bacterial growth while minimizing changes in protein functionality due to chemical degradation/denaturation. It appears that any substantial exposure to higher temperatures can cause changes in the protein which can make concentrated solutions more prone to gelling, e.g., during a subsequent spray drying operation.

When the membrane filtration is run as a batch operation, the membranes are generally cleaned in between each run. Typically the membrane system will have been cleaned and sanitized the day before a run and the membranes will be stored if needed in a sanitizer (e.g., sodium hypochlorite) solution. Before use, the membrane system sanitizer solution is then drained out of the membrane system and the entire system is rinsed with water. When the membrane separation is carried out as a continuous operation, the membranes are commonly shut down at periodic intervals and cleaned in a similar fashion.

By selecting a membrane which can be effectively cleaned (e.g., a membrane with low contact angle filtering surface such as a modified PAN membrane) it is possible to carry out membrane filtration of concentrated oilseed protein extracts which produce retentates having relatively low bacterial levels.

Membrane Construction

The surfaces of the membrane used in the present process typically include functional groups which are hydrophilic, that is showing an affinity to water. The membranes are commonly formed from molecules of a suitable polymer having pendent groups which provide on the surface of the matrix sufficient uncharged, hydrophilic polar groups to render the surface hydrophilic. These groups may be obtained by derivatization of the pendent groups of the polymer or the groups may be "prefabricated" and then deposited or grafted directly onto the polymer at the surface of the matrix. It is likewise possible that one can deposit hydrophobic pendent groups on the surface of the matrix and then derivatize all or a portion of the groups to appropriate groups to render the surface hydrophilic. Similarly, monomers containing appropriate pendent groups may be deposited or grafted onto the surface of the matrix. Examples of membranes with relatively hydrophilic surfaces are described in U.S. Pat. No. 4,147,745, U.S. Pat. No. 4,943,374, U.S. Pat. No. 5,000,848, U.S. Pat. No. 5,503,746, U.S. Pat. No. 5,456,843, and U.S. Pat. No. 5,939,182, the disclosures of which are herein incorporated by reference. Examples of suitable membranes are also disclosed in U.S. Pat. No. 6,630,195, the disclosure of which is herein incorporated by reference.

In order to permit the membranes to be cleaned effectively to remove residual organic matter and avoid problems with bacterial contamination, it is generally preferable to utilize relatively robust membranes. Cleaning of a membrane can be greatly facilitated if the membrane is capable of withstanding relatively high temperatures (e.g., up to about 50° C.), is capable of withstanding treatment with an oxidizing solution (e.g., an aqueous hypochlorite solution), is capable of withstanding treatment with a surfactant-based cleaning solution, and/or can withstand exposure to aqueous solutions with a range of pH, such as solutions with pHs ranging from about 5 to 11 and, preferably, with pHs ranging from about 2 to about 12.

Downstream Processing of Retentate

The retentate produced by the membrane filtration operation is often pasteurized to ensure that microbial activity is minimized. The pasteurization generally entails raising the internal temperature of the retentate to at least about 180° F., and more commonly, to at least about 200° F. and maintaining that temperature for a sufficient amount of time to kill most of the bacteria present in the solution. The product commonly is pasteurized by subjecting the concentrated retentate to UHT treatment. The UHT treatment can be carried out by pumping the concentrate retentate through a steam injector where the protein-containing retentate is mixed with live steam and can be heated rapidly to about 200-250° F., suitably to about 210-240° F., and more suitably to about 210° F. (circa 205-215° C.). The heated concentrate can then be passed through a hold tube, under pressure, for a relatively short period of time (e.g. about 2 to 30 seconds, suitably about 5 to 20 seconds, more suitably about 9 to 15 seconds). The length of the time under UHT conditions can easily be controlled by varying the length of the tube. After the hold tube, the heated retentate can be cooled by passage into to a vacuum vessel. The evaporation of water from the retentate under vacuum results in flash cooling of the heated solution, allowing the temperature to be rapidly dropped to the range of about 130-140° F. (circa 45-50° C.). Typically, it can be advantageous to adjust the pH of the retentate to about 7.0 to 7.8 before UHT treatment. Dilute HCl or sodium hydroxide can typically be used to adjust the pH of the retentate. Typically, the pH of the retentate can be maintained at about 7.0 to 7.8 (commonly at about 7.1 to 7.7, suitably at about 7.2 to 7.4, and more suitably at about 7.3) throughout pasteurization (e.g., UHT treatment).

The UHT treatment may be carried out prior to membrane filtration. According to one suitable embodiment, the extract may be subjected to UHT treatment during the extraction process (e.g., between stages in a multi-stage extraction process). This type of treatment has been found to be very effective at destroying bacteria while avoiding substantial chemical degradation of the protein. It may also be quite effective in reducing membrane contamination.

To improve its storage properties, the modified oilseed product is typically dried such that the product contains no more than about 12 wt. % moisture, and preferably, no more than about 8 wt. % moisture, based upon the weight of the final dried product. Depending on the drying method utilized and the form of the dried product, after drying the product may be ground into free-flowing solid particles in order to facilitate handling and packaging. For example, if the dried, modified oilseed product is dried into a cake, it can be ground into a dried powder, preferably such that at least about 95 wt. % of the material is in the form of particles having a size of no more than about 10 mesh.

In an alternate process, the pH of the liquid retentate can be adjusted (if needed) to about 7.0 to 7.8 (commonly to about 7.1 to 7.7, suitably to about 7.2 to 7.4, and more suitably to about 7.3). The liquid retentate may be spray dried to form a dry powdered product. The spray dried product is preferably dried to a water content of no more than about 10 wt. % water and, more preferably, about 4-6 wt. % water.

In one embodiment, the retentate can be spray dried by passing a concentrated solution (e.g., circa 10-16 wt. % solids) of the retentate through a spray dryer with a dryer inlet temperature of about 230-270° C., a feed pump pressure of about 1500-2500 psig and a discharge air temperature of about 75-95° C.

In some instances, it may be advantageous to concentrate the retentate produced by the membrane filtration operation prior to a final spray drying step. A suitable protein containing concentrate may be formed by using conventional evaporative techniques, generally with the aid of vacuum to avoid extensive heating of the processed soy protein material. Where a concentration step of this type is included in the process, it normally occurs after the pH of the retentate has been adjusted to a neutral pH (e.g., a pH of about 6.8 to 7.4).

Before the heating, which can occur as part of either the spray drying or UHT treatment, it is typically advantageous to adjust the pH of the retentate or protein-containing concentrate to about 7.0 to 7.8 (commonly to about 7.1 to 7.7, suitably to about 7.2 to 7.4, and more suitably to about 7.3). For example, the pH of the retentate can be adjusted prior to any further treatment which involves heating the sample. Heating the retentate or protein-containing concentrate can alter the molecular weight profile and consequently the functionality of the product.

Characteristics of Modified Oilseed Material

The modified oilseed material can be derived from a variety of precursor oilseed materials, such as soybean meal, canola meal, sunflower meal, cottonseed meal, peanut meal, lupin meal or mixtures thereof. Soy bean flake or meal are particularly suitable sources of oilseed protein to utilize in the present method. The modified oilseed material can have a variety of characteristics that make it suitable for use as a protein source for incorporation into foods for human and/or animal consumption.

The modified oilseed material can be used to produce protein supplemented food products for human consumption. Examples of protein supplemented food products include beverages, processed meats, frozen desserts, confectionery products, dairy-type products, sauce compositions, and cereal grain products. The amount of modified oilseed material used to supplement a food product can vary greatly depending on the particular food product. The food products provided herein are for illustrative purposes only and are not meant to be an exhaustive list.

A modified oilseed material with a high gel strength is particularly advantageous for incorporation into processed meat products. Examples of protein supplemented meat products include ground chicken products, water-added ham products, bologna, hot dogs, franks, chicken patties, chicken nuggets, beef patties, fish patties, surimi, bacon, luncheon meat, sandwich fillings, deli meats, meat snacks, meatballs, jerky, fajitas, bacon bits, injected meats, and bratwurst.

A modified oilseed material with a high gel strength is also particularly advantageous for incorporation in various meat analog products that may be meat-like in texture or appearance. Examples of such products include vegetarian patties and nuggets, vegetarian hotdogs and franks, flavored coarse textured sausages and emulsified sausage analogs.

A modified oilseed material with a high gel strength is also particularly advantageous for incorporation in sauces and soups. Examples of such products include "cream" soups (e.g., cream of mushroom, cream of corn), "cream" and "cheese" sauces (e.g., Alfredo sauce, Mornay sauce).

The modified oilseed material formed by the present method typically includes a high percentage of high molecular weight proteins and is less contaminated with low molecular weight proteins. A suitable method to analyze the content of high molecular weight proteins found in the material is based on chromatographic data as described in Example 8.

The raw chromatogramic data may be used to calculate a number of different metrics. One metric is to calculate the molecular weight at which 50% of the mass is above and 50% of the mass is below. This first metric is not precisely the mean molecular weight, but is closer to a weighted average molecular weight. This is referred to herein by the term "$MW_{50}$." Another metric is to calculate the wt. % of modified oilseed material that has an apparent molecular weight that is greater than 300 kDa. Yet another metric is to calculate the wt. % of modified oilseed material that has an apparent molecular weight that is less than 100 kDa. Any one of these three metrics may be used individually to characterize the molecular weight of a particular modified oilseed material.

Alternatively, combinations of two or more of these metrics may be used to characterize the molecular weight profile of a modified oilseed material. Preferably, the modified oilseed material formed by the present method has a $MW_{50}$ of at least about 200 kDa. More preferably, at least about 400 kDa. Modified oilseed material that has a $MW_{50}$ of at least about 600 kDa can be particularly suitable for some applications. As for the second metric mentioned above, at least about 40% of a suitable modified oilseed material may have an apparent molecular weight of greater than 300 kDa. For some applications, it may be desirable if at least about 60% of the modified oilseed material has an apparent molecular weight of greater than 300 kDa.

According to the third metric mentioned above, preferably no more than about 40% of the modified oilseed material has an apparent molecular weight of less than 100 kDa. For some applications, however, preferably no more than about 35% of the modified oilseed material has an apparent molecular weight of less than 100 kDa. A suitable modified oilseed material may meet the preferred values of one or more of these three metrics. For example, a particularly suitable modified oilseed material may have a $MW_{50}$ of at least about 200 kDa and at least about 60% of the modified oilseed material has an apparent molecular weight of greater than 300 kDa. Modified oilseed material that has a $MW_{50}$ at least about 600 kDa and at least about 60% of the modified oilseed material has an apparent molecular weight of greater than 300 kDa can be formed by the present method.

Upon heating, protein molecules vibrate more vigorously and bind more water, i.e., become more highly hydrated. At some point, the molecules lose their native conformation and become totally exposed to the water. This is called gelatinization in starch and denaturation in proteins. Further heating can decrease viscosity as all interactions between molecules are disrupted. Upon cooling, both starches and proteins can form networks with high viscosity (called gels).

For some food related applications the ability of a modified oilseed material to form a gel can be an important functional characteristic. In gelling, the protein denatures to form a loose network of protein surrounding and binding a large amount of water. As used herein, the term "gel strength" refers to the breaking strength according to the analysis described in Example 3. Modified oilseed materials formed by the present method may have a gel strength of at least about 0.50 N. A suitable modified oilseed material formed by the present method may have a gel strength of at least about 0.60 N. A particularly suitable modified oilseed material formed by the present method may have a gel strength of at least about 0.70 N. Other characteristics that can be important for particular food compositions include molecular weight, viscosity, emulsion stability and protein content. Specific properties according to one or more of these characteristics may be advantageous in developing protein supplemented food products.

The modified oilseed material formed by the present method typically demonstrate desirable viscosity properties. A modified oilseed material that provides a thinner solution under a certain set of parameters is advantageous in applications like meat injection where thinner solutions can more easily be injected or massaged into meat products. Typically, a modified oilseed material that does not show thinning upon heating is generally preferred. For some applications, it is a desirable property to be able to maintain viscosity through heating and cooling cycles. Modified oilseed materials formed by the present method may increase viscosity with heating so its hold on water is improving during the early stage of cooking. In contrast, most commercial samples decrease in viscosity early in cooking and decrease their hold on the water.

Rapid Viscosity Analysis ("RVA") was developed for analysis of starchy samples and is generally similar to Braebender analysis. Given the analogy between starch and protein systems, one can apply the RVA analysis described in Example 4 to the modified oilseed materials formed by the present method.

According to RVA analysis described in Example 4, one can measure the viscosity after about 10 minutes of blending. A suitable modified oilseed material may have a viscosity of at least about 0.30 $Nsm^{-2}$. A particularly suitable modified oilseed material may have a viscosity of at least about 0.40 $Nsm^{-2}$. As shown in Table 2, modified oilseed materials formed by the present method showed a viscosity of at least about 0.50 $Nsm^{-2}$.

Another indication of viscosity can be obtained through a heating and cooling cycle in the RVA such as by the analysis described in Example 5. According to this method, the viscosity can be measured at certain intervals throughout the heating and cooling cycle(s). According to the method described in Example 5, a suitable modified oilseed material may have a final viscosity (at 35 min) of at least about 0.50 $Nsm^{-2}$. A particularly suitable modified oilseed material may have a final viscosity of at least about 0.60 $Nsm^2$. As shown in Table 4, modified oilseed materials formed by the present method showed a final viscosity of at least about 0.60 $Nsm^{-2}$.

A similar analysis of viscosity can be obtained through a heating and cooling cycle in the RVA in the presence of NaCl such as by the method described in Example 6. According to the method described in Example 6, in the presence of 2% NaCl a suitable modified oilseed material may have an increase in viscosity through the cooling and heating cycles. A particularly suitable modified oilseed material may have a final viscosity (at 35 min.) of at least about 0.45 $Nsm^{-2}$ in the presence of 2% NaCl. As shown in Table 5, modified oilseed materials formed by the present method showed a final viscosity of at least about 0.46 $Nsm^{-2}$.

For some food related applications the ability of a modified oilseed material to form an emulsion can be an important functional characteristic. Oil and water are not miscible and in the absence of a material to stabilize the interface between them, the total surface area of the interface will be minimized. This typically leads to separate oil and water phases. Proteins can stabilize these interfaces by denaturing onto the surface providing a coating to a droplet (whether of oil or water). The protein can interact with both the oil and the water and, in effect, insulate each from the other. Large molecular weight proteins are believed to be able to denature onto such a droplet surface and provide greater stability than small proteins and thereby prevent droplet coalescence.

Emulsion stability may be determined based according to the procedure described in Example 7. According to this procedure, a sample is analyzed according to the amount of oil released from the emulsion. As used herein, the "Emulsion Stability Index" or "ESI" refers to the diameter of the "fat spot" or "oil ring" caused by the amount of oil released from the emulsion according to the conditions of the analysis described in Example 7. Modified oilseed protein products prepared by the present method commonly form relatively stable emulsions. Typically, in the absence of stress, essentially no oil will separate from the emulsions within 2-3 hours. After the heating procedure described in Example 7, a suitable material may have an ESI of no more than about 70 mm. A particularly suitable emulsion may have an ESI of no more than about 60 mm and more desirably, no more than about 50 mm.

The modified oilseed material formed by the present method can have a variety of characteristics that make it suitable for use as a protein source for incorporation into food products for human and/or animal consumption. A suitable modified oilseed material may include at least about 85 wt. % (dsb) protein, preferably at least about 90 wt. % (dsb) protein. A suitable modified oilseed material may also have a $MW_{50}$ of at least about 200 kDa and/or at least about 40% of the material has an apparent molecular weight of greater than 300 kDa.

The modified oilseed material may also have one or more of the following characteristics: a gel breaking strength of at least about 0.50 N; an ESI of no more than about 70 mm; an NSI of at least about 80; at least about 1.4% cysteine as a percentage of total protein; a Gardner L value of at least about 85; and a substantially bland taste.

The modified oilseed material may also have one or more of the following characteristics: a viscosity of at least about 0.30 $Nsm^{-2}$; a final viscosity of at least about 0.50 $Nsm^{-2}$ after a heating and cooling cycle; and a final viscosity of at least about 0.45 $Nsm^{-2}$ after a heating and cooling cycle in the presence of 2% NaCl.

A particularly desirable modified oilseed material formed by the present method which may be used to produce a protein supplemented food product may include at least about 85 wt. % (dsb) protein, preferably at least about 90 wt. % (dsb) protein, and meet one or more of the following criteria: a $MW_{50}$ of at least about 400 kDa; at least about 60% of the, material has an apparent molecular weight of greater than 300 kDa.

A particularly desirable modified oilseed material may also have one or more of the following characteristics: a gel breaking strength of at least about 60 N; an ESI of no more than about 60 mm; a solids profile of no more than about 10.75%; a viscosity of at least about 0.40 $Nsm^{-2}$; a final viscosity of at least about 0.60 $Nsm^{-2}$ after a heating and cooling cycle; and a final viscosity of at least about 0.46 $Nsm^{-2}$ after a heating and cooling cycle in the presence of 2% NaCl.

A particularly desirable modified oilseed material may also have one or more of the following characteristics: a gel breaking strength of at least about 70 N; an ESI of no more than about 50 mm; and a viscosity of at least about 0.50 $Nsm^{-2}$.

EXAMPLE 1

Extractions were carried out in a two-stage counter-current extraction system. One pound per minute of soy white flakes were mixed continuously with 1.7 gpm of partially-enriched extract. The temperature in the tank was controlled at 120° F. and the pH was maintained at about 7.0 by addition of caustic soda (as needed). The average extraction retention time of 25 min. was maintained by controlling the discharge rate of the tank. Slurry was pumped continuously from the extraction tank to a decanter centrifuge where the slurry was separated into two streams; a protein rich liquor stream and a partially-extracted flake stream. The protein-rich extract went to a desludging centrifuge for clarification and then to the membrane feed tank. The partially-extracted flakes went to a second extraction tank where they were continuously mixed with 1.7 gpm of city water. Caustic soda (NaOH) was added to the tank to control the pH in the tank at 8.5. The temperature in the tank was controlled at 130° F. The average extraction retention time of 25 min. was maintained by controlling the discharge rate of the tank. Slurry was pumped continuously from the extraction tank to a decanter centrifuge where the slurry was separated into two streams; a partially-enriched protein liquor stream and a spent flake stream. The partially-enriched protein liquor stream was sent to the first tank to extract fresh white flakes.

The extraction tank, centrifuge and interconnecting piping were cleaned with a 0.75% caustic solution and sanitized with a 500 ppm sodium hypochlorite (NaOCl) solution prior to use.

Extract liquor was pumped to a Membrane Feed Tank. The extract liquor contains about 3.0% protein. The Membrane systems are used to separate the protein from the soluble carbohydrates and other soluble components (e.g., inorganic salts) using ultrafiltration membranes. After about 100 gallons of extract solution was transferred from the extraction system to the membrane feed tank, the extract liquor was recirculated at an approximate flow rate of about 80 gpm through the membrane system. The temperature of the extract liquor was controlled at 140° F. (60° C.) with an in-line heat exchanger. The pH of the extract liquor was adjusted to and maintained at 7.3 with caustic soda. A total of 300 gallons of extract liquor was transferred to a membrane feed tank.

After all of the extract liquor has been transferred to the membrane feed tank, the extract liquor held at 140° F. (60° C.) was recirculated over the membranes at 80 gpm with the membrane back pressure controlled at 10-20 psig. The membrane filtration system contained six modified PAN membranes with a nominal 50,000 MWCO (MX-50 membranes available from Osmonics, Minnetonka, Minn.). The total filtration surface area of the array of membranes was approximately 1260 sq. feet.

During the initial concentration phase of the membrane filtration, the permeate flux typically varied from an initial rate of about 2.5 gpm to about 1.5 gpm during the later stages of the concentration. During this step the protein was concentrated from 3% to about 10%.

After the initial concentration phase, 100 gallons of 140° F. (60° C.) water was added to a Membrane Feed Tank, which dilutes the protein content down to about 3.3%. The protein content was then concentrated back up to 10% solids. This is referred to as a diafiltration step. Two diafiltration steps were used to increase the protein content of the solids, in the concentrate stream, up to 90% (dsb) minimum. During this run the permeate from the membrane system was discarded.

After the second diafiltration, the retentate from the membrane system was transferred to a UHT feed tank. The membrane system was flushed with 30 gallons of city water to recover additional protein from the system. This flush water was combined with the retentate in the UHT feed tank. Prior to the next operation, the pH of the retentate was adjusted to 7.1 to 7.7 (measured at room temperature) with dilute HCl or sodium hydroxide.

Following pH adjustment, the retentate was subjected to ultra-high temperature ("UHT") treatment in order to pasteurize the retentate. The UHT step consists of pumping the concentrate at 2 gpm to a steam injector. In the steam injector, the concentrate is mixed with live steam and heated instantly to 210° F. to 240° F. The heated concentrate passes through a hold tube, under pressure, for 12 seconds. After the hold tube, the product flows in to a vacuum vessel where the product is flash cooled to 130° F. (54° C.). The product is then spray dried. The UHT step is very effective in killing bacteria, even thermophiles. Total plate counts could be reduced from as high as 300,000 cfu/g to around 100 cfu/g after the UHT operation.

The UHT treated material was then spray dried to yield a soy protein product having an average particle size of about 80 microns, contained circa 90 wt. % protein (dsb) and a water content of about 8-9 wt. %.

EXAMPLE 2

Composite Sample of Modified Oilseed Material

A composite sample of soy protein material was constructed by mixing equal parts of five soy protein products produced by the method described in Example 1 and identified as soy protein products 10.14, 10.20, 10.26, 10.31, and 10.32 in Example 10. This composite soy protein material was analyzed as described in Examples 3 to 9.

EXAMPLE 3

Gel Properties of Modified Oilseed Material

One measure of the ability of soy protein isolates to interact with water can be seen in gelling tests. In gelling, the protein denatures to form a loose network of protein surrounding and binding a large volume of water. A number of gelling measures can be used, but measurement of gel strength after setting and equilibrating at refrigerator temperature was chosen.

The soy gel determinations were conducted according to the following procedure:
1. Weigh 21 g soy protein isolate.
2. Put 129 mL distilled water into the bowl of a mini-food processor (approx. 1.5 cup model).
3. Add soy isolate to the bowl. Mix for 15 seconds. Scrape down sides to get isolate wet.
4. Mix another 45 seconds.
5. Put 25 g of mixture into a 50-mL disposable centrifuge tube.
6. Place in a clinical centrifuge. Run speed to maximum then turn off centrifuge.
7. Place tubes in 85° C. water bath for 30 minutes.
8. Place tubes in 4° C. cooler overnight.
9. Using a narrow spatula, remove gel from centrifuge tube. Place on a flat surface.
10. Using a 45° knife mounted on a Texture Technologies TA-XT2 texture analyzer, measure gel strength. Penetrate gel 10 mm at 1 mm/sec. Measure at 3 points along gel length and record average.

The results of the gel tests are shown in Table 1, which is a comparison of gel strengths for commercial samples and the composite soy protein material of Example 2. As used herein, the term "gel strength" is used to refer to gel strengths of modified oilseed materials measured under this set of conditions.

TABLE 1

| Soy Isolate | Gel Strength (N) |
| --- | --- |
| Ex. 2 Composite | 0.502 |
| Profam 974 | 0.231 |
| Profam 982 | 0.223 |
| Samprosoy 90NB | 0.075 |
| Supro 500E | 0.183 |
| Supro EX33 | 0.400 |
| Supro ST | 0.240 |
| Samprosoy 90MP | 0.456 |

This analysis shows that the composite soy protein material of Example 2 has a high gel strength. Only Samprosoy 90 MP has a gel strength approaching that of the composite soy protein material of Example 2.

EXAMPLE 4

Viscosity of Modified Oilseed Material

Viscosity is generally a measure of the thickness of a fluid, while gel strength is a property of a solid. In practice, the boundary between these measures is unclear. A very weak gel can be fluid and a very viscous fluid can be solid like. At a more practical level, it may be desirable for a soy isolate to form a thin (low viscosity) fluid in water that significantly increases in viscosity during heat (or subsequent cooling) to the point where it forms a gel. For example, formation of a thin fluid enables injection of the fluid into a whole muscle piece of meat that can then solidify during cooking, trapping water in the product. Similarly, a product forming a thin liquid can be used to form an emulsion with oil or fat that then sets during cooking. At the soy protein concentrations typically used in meat (1-2% on a whole product basis, perhaps 10% on a "brine" basis), only very weak gels would form and these would be better thought of as viscous fluids.

Rapid Viscosity Analysis ("RVA") was developed for analysis of starchy samples and is generally similar to Braebender analysis. For example, a sample is dispersed in water with stirring. The dispersion is maintained at a constant temperature and the viscosity (resistance to stirring) is measured.

The viscosity determinations were conducted according to the following procedure:
1. 25.0 g of isolate is dispersed in 175 mL water in a Waring blender with a brief pulse (up to 5 sec) of blending.
2. Splattered material is scrapped down into the mix and the blending repeated.
3. The pH of the dispersion is adjusted with HCl or NaOH to the desired pH, typically 7.0.
4. 30 g of dispersion is weighed into a RVA canister and mounted onto the RVA.
5. The RVA was set to maintain the sample at 37° C. with a paddle speed of 960 rpm.

A comparison of the soy isolate dispersions at 12.5% solids, pH 7.0 and 37° C. are shown in Table 2. As used herein, the term "dispersion viscosity" is used to refer to viscosities of modified oilseed materials measured under this set of conditions.

TABLE 2

|  | Viscosity (Nsm$^{-2}$) |
| --- | --- |
| Ex. 2 Composite | 0.500 |
| Supro500E | 0.365 |
| Supro515 | 0.406 |
| Profam 974 | 0.424 |
| Profam 982 | 0.332 |
| Supro ST | 0.321 |
| Samprosoy 90NB | 0.465 |
| Supro EX 33 | 0.412 |
| Samprosoy 90MP | 0.456 |

This analysis shows that the composite soy protein material of Example 2 has a high viscosity, with the viscosity of only Supro EX33 and the two Samprosoy samples approaching that of the composite soy protein material of Example 2.

EXAMPLE 5

Viscosity of Modified Oilseed Material Upon Heating

Another indication of viscosity can be obtained through a heating and cooling cycle in the RVA. Viscosity of 11% dispersions at pH 7.0 with 540 rmp shear was recorded at 5, 20 and 35 minutes (e.g., at the initial temperature of 35° C., after 10 minutes at 85° C., and 7 minutes after a return to 35° C.) as described in Table 3. A suitable modified oilseed material may have a low initial viscosity and form a very high viscosity after heating. A viscosity change ratio, the ratio of final to initial viscosity, may also be calculated according to this analysis.

TABLE 3

| Initial time (min) | Final time (min) | Initial Temperature (° C.) | Final Temperature (° C.) |
| --- | --- | --- | --- |
| 0 | 5 | 35 | 35 |
| 5 | 10 | 35 | 85 |
| 10 | 22 | 85 | 85 |
| 22 | 27 | 85 | 35 |
| 27 | 35 | 85 | 35 |

As can be seen in Table 4, the composite soy protein material of Example 2 has an initial viscosity comparable to other commercial samples. Although all of the materials show significantly lower viscosity at 20 minutes in the cycle (near the end of the heating), the composite soy protein material of Example 2 shows the highest viscosity. Once the dispersions have stabilized at 35° C. again, the composite soy protein material of Example 2 has a higher viscosity compared to the other soy protein materials. While one of the least viscous materials initially, the composite soy protein material of Example 2 has the highest viscosity after the heating and cooling cycle.

Table 4 shows the viscosity changes in 11% dispersions of soy isolate taken through a heating cycle as described in Table 3. As used herein, the term "final viscosity" is used to refer to viscosities of modified oilseed materials at 35 min. measured under this set of conditions.

TABLE 4

|  | 5 min (Nsm$^{-2}$) | 20 min (Nsm$^{-2}$) | 35 min (Nsm$^{-2}$) |
| --- | --- | --- | --- |
| Ex. 2 Composite | 0.495 | 0.329 | 0.602 |
| Supro500E | 0.583 | 0.206 | 0.371 |
| Supro515 | 0.746 | 0.179 | 0.364 |
| Profam 974 | 0.283 | 0.170 | 0.299 |
| Profam 982 | 0.492 | 0.175 | 0.275 |
| Supro ST | 0.532 | 0.213 | 0.352 |
| Samprosoy 90NB | 0.449 | 0.094 | 0.148 |
| Supro EX33 | 0.503 | 0.162 | 0.296 |
| Samprosoy 90MP | 0.386 | 0.216 | 0.421 |

EXAMPLE 6

Viscosity of Modified Oilseed Material Upon Heating in the Presence of NaCl

Because meat products are typically processed with salt, the analysis described in Example 5 was repeated with the inclusion of 2% NaCl. The results are shown in Table 5.

Table 5 shows the viscosity changes in 11% dispersions of soy isolate taken through a heating cycle, in the presence of 2% NaCl, as described in Table 3.

TABLE 5

|  | 5 min (Nsm$^{-2}$) | 20 min (Nsm$^{-2}$) | 35 min (Nsm$^{-2}$) |
| --- | --- | --- | --- |
| Ex. 2 Composite | 0.347 | 0.308 | 0.466 |
| Supro500E | 0.238 | 0.234 | 0.336 |
| Supro515 | 0.275 | 0.263 | 0.387 |
| Profam 974 | 0.228 | 0.194 | 0.293 |
| Profam 982 | 0.218 | 0.217 | 0.284 |
| Supro ST | 0.268 | 0.224 | 0.322 |
| Samprosoy 90NB | 0.222 | 0.148 | 0.216 |
| Supro EX33 | 0.235 | 0.238 | 0.38 |
| Samprosoy 90MP | 0.329 | 0.353 | 0.583 |

Generally, the viscosities are much lower in the presence of salt. Further, in the presence of salt, the materials typically have final viscosities that are higher than the initial viscosities. The composite soy protein material of Example 2 is one of the least sensitive products to salt as it was not significantly effected by salt.

Table 6 is a comparison of initial and final viscosities in the presence of 2% NaCl.

TABLE 6

|  | 5 min (Nsm$^{-2}$) | 35 min (Nsm$^{-2}$) | Final/Initial (Nsm$^{-2}$) |
|---|---|---|---|
| Ex. 2 Composite | 0.347 | 0.466 | 1.34 |
| Supro 500E | 0.238 | 0.336 | 1.41 |
| Supro 515 | 0.275 | 0.387 | 1.41 |
| Profram 974 | 0.228 | 0.293 | 1.29 |
| Profram 982 | 0.218 | 0.284 | 1.30 |
| Supro ST | 0.268 | 0.322 | 1.20 |
| Samprosoy 90NB | 0.222 | 0.216 | 0.97 |
| Supro EX33 | 0.235 | 0.38 | 1.62 |
| Samprosoy 90MP | 0.329 | 0.583 | 1.77 |

EXAMPLE 7

Emulsion Stability of Modified Oilseed Material

One of the potential functional properties of proteins is stabilization of interfaces, for example the oil-water interface. Oil and water are not miscible and in the absence of a material to stabilize the interface between them, the total surface area of the interface will be minimized. This typically leads to separate oil and water phases. It is widely believed that proteins can stabilize these interfaces.

An analysis was performed according to the following procedure:
1. Weigh 10.7 g of soy isolate.
2. Weigh 75 g of chilled distilled water.
3. Weight 75 g of cold (4° C.) lard.
4. Add water to processor bowl (Cuisinart Little Pro Plus™ metal blade).
5. Add soy isolate to processor bowl.
6. Mix 30 seconds.
7. Stop and scrape down sides.
8. Add the cold lard.
9. Mix 30 seconds (total of 1 minute mixing time).
10. Stop and scrape down sides.
11. Mix 2 minutes (total of 3 minutes mixing time).

Using a cut off 3 cc syringe, the emulsion is removed and 1 mL of emulsion is placed onto the center of a 125 mm diameter #4 Whatman filter paper. The filter paper is placed in a 100° C. oven for exactly 30 minutes. The filter paper is removed and the edges of the "fat spot" or "oil ring" are marked. The diameter of the spot is measured in mm using a transparent ruler. (if an oval spot is obtained, both diameters are measured and averaged.)

In general terms, an emulsion can have a physical strength (resistance to deformation) as well as a stability (persistence of emulsion survival). It is commonly assumed that a physically strong emulsion should be physically more stable also. In the method described here, more thermally stable emulsions will release less water and oil and consequently have a smaller fat spot or oil ring. It has generally been observed that there is an inverse correlation between the emulsion physical strength and the diameter of the oil ring ("Emulsion Stability Index" or "ESI"), suggesting that stronger emulsions are less thermally stable. As the results in Table 7 show, the composite soy protein material of Example 2 produces a relatively weak, but a very stable emulsion. This suggests that the composite soy protein material of Example 2 may provide a positive combination of gel strength and emulsion stability in processed meat systems.

TABLE 7

|  | ESI (mm) |
|---|---|
| Ex. 2 Composite | 50.0 |
| Supro500E | 103.0 |
| Supro515 | 90.5 |
| Profam 974 | 92.3 |
| Profam 982 | 87.8 |
| Supro ST | 91.3 |
| Samprosoy 90NB | 91.0 |
| Supro EX33 | 83.5 |
| Samprosoy 90MP | 87.0 |

EXAMPLE 8

Molecular Weight Profiles of Modified Oilseed Material

One indicator of the amount of proteins still present in their native structure is their molecular weight profile. For pure proteins, chromatography usually reveals a single symmetric peak. Mixtures of proteins, as would exist in soy isolate, should generally consist of a series of symmetric peaks. If processing did not result in breaking up of the protein, a similar profile would be expected to be observed for soy isolates.

Samples of soy protein products were prepared as 1% dispersions in water at pH 7.0 are prepared, by shaking for 1 hour. The samples were centrifuged for 1 minute in a microfuge to settle the insolubles. Supernatant (100 µL) was diluted with solvent (900 µL), filtered through a 0.45 µm syringe filter and 100 µL of the filtered sample was injected onto the HPLC. The HPLC columns were a tandem set comprising Biorad SEC 125 and SEC 250 gel chromatography columns equilibrated with 50 mM sodium phosphate-NaOH (pH 6.8), 0.01% w/v sodium azide. Flow rate was set at 0.5 mL/min and the elution of proteins was monitored at 280 nm. The resulting chromatogram is divided into slices of approximately 0.3 minutes and the percent of the sample in each slice compared to the calculated molecular weight (MW) of that slice based on MW markers. The entire profile is then plotted as cumulative percentage graph and three measures recorded: the median MW ($MW_{50}$), the percentage of the sample greater than 300 kDa, and the percentage of the sample less than 100 kDa. Soy isolates with very high $MW_{50}$ and MW>300 are product that have experienced relatively little hydrolysis. Hydrolyzed samples would be low in these two measures but high in MW<100. In addition to the samples of the soy protein products, a sample of fresh, clarified extract (pH 8.5) of soy flakes was diluted in equilibration buffer and run to provide an untreated comparison. In brief, the vast majority of commercial samples (not shown) show signs of degradation, sometimes significant amounts of degradation. The composite soy protein material of Example 2, however, showed substantially less evidence of degradation.

Degradation could be accidental or deliberate. Accidental degradation could arise from mechanical damage (e.g., high shear or cavitation mixing), acid or alkali hydrolysis during heating steps, or enzymatic hydrolysis at any time during processing. The enzymatic hydrolysis could be due to either protein degrading enzymes naturally present in the soy or enzymes secreted by contaminating bacteria. The proteins could also be intentionally degraded in order to alter the functional properties of the protein. Partial hydrolysis can improve emulsification or foaming properties of soy proteins. Extensive hydrolysis can improve solubility under acidic conditions.

Samples of commercial soy isolates were obtained from various commercial sources. The collection of the raw molecular weight profile data is described above.

The analysis is analogous to that used for particle size analysis in emulsions. For example, one can ask what percentage of the material is less than 100 kDa. For Samprosoy 90 MP, the less than 100 kDa fraction comprises about 57%, while for the composite soy protein material of Example 2, this fraction comprises about 36%. Another way to analyze the chromatographic data is to calculate the molecular weight at which 50% of the mass is above and 50% of the mass is below. This is not precisely the mean molecular weight, but is closer to a weighted average molecular weight. This is referred to herein by the term "$MW_{50}$." The $MW_{50}$ for Samprosoy 90 MP is about 56 kDa, while the $MW_{50}$ for the material formed by the method of Example 1 material is about 229 kDa.

As the results in Table 8 indicate, the composite soy protein material of Example 2 has the highest MW>300 and by far the highest $MW_{50}$. The $MW_{50}$ for the composite soy protein material of Example 2 is almost double the second highest product's $MW_{50}$. This indicates that the protein participating in the gel network is potentially capable of forming many interactions due to the large molecular weight (and the presumed greater protein surface available to any single molecule for interaction).

Table 8 shows measurements of molecular weight distribution for soy isolates. $MW_{50}$ is the median molecular weight, MW>300 is the percent of the protein with an apparent molecular weight greater than 300 kDa, and MW<100 is the percent of protein with an apparent molecular weight less than 100 kDa.

TABLE 8

|  | MW >300 (%) | MW <100 (%) | $MW_{50}$ |
|---|---|---|---|
| Ex. 2 Composite | 45 | 36 | 229 |
| Supro500E | 16 | 60 | 68 |
| Supro515 | 18 | 65 | 60 |
| Profam 974 | 20 | 66 | 39 |
| Profam 982 | 2.5 | 87 | 25 |
| Supro ST | 3 | 74 | 9 |
| Samprosoy 90NB | 11 | 61 | 58 |
| Supro EX33 | 42 | 47 | 117 |
| Samprosoy 90MP | 37 | 53 | 56 |

The composite soy protein material of Example 2 has a higher percentage of high molecular weight proteins than the commercial samples. Most commercial samples examined had significantly less high molecular weight material.

The possible impacts of higher molecular weight fractions could come in a number of areas. One benefit is the reduced presence of bitter peptides. Hydrolysis of proteins to low molecular weight peptides (400<MW<2000) often results in production of compounds with bitter flavor. One example of this is aspartame, which is associated exceptional sweetness but also with a bitter aftertaste. The flavor of soy protein is derived from a complex mixture of components. Bitterness is one of these off-flavors. The reduced peptide content could contribute to a less bitter tasting product.

A second consequence of high molecular weight could be in interface stabilization. Though air-water and oil-water interfaces may be better stabilized initially by lower molecular weight materials, longer-term stabilization of these surfaces may depend on larger molecules.

EXAMPLE 9

Solids Profiles of Modified Oilseed Material

Another indication of viscosity is to consider the concentration of material required to obtain a selected viscosity. In this analysis, a line can be fit to the data for viscosity versus concentration (over the range of 6-18% solids). The equation for the line is rearranged so that a constant viscosity can be used to calculate the equivalent solids concentration. A viscosity of 0.4 $Nsm^{-2}$ was selected and the respective concentrations were calculated. The resulting solids profiles for this analysis are shown in Table 9. The solids concentration or a wt. % basis of the modified oilseed material required to achieve a viscosity of 0.4 $Nsm^{-2}$ is referred to herein as the "solids profile."

The extra material required, as a percentage of the composite soy protein material of Example 2, to obtain the same viscosity was calculated. As shown in Table 9, the composite soy protein material of Example 2 is 11 to 45% more effective than the comparable commercial products.

TABLE 9

|  | Solids Profiles (%) | % of Ex. 2 Composite |
|---|---|---|
| Ex. 2 Composite | 10.69 | 100% |
| Supro 500E | 13.75 | 129% |
| Supro 515 | 12.59 | 118% |
| Supro EX33 | 13.06 | 122% |
| Supro ST | 13.05 | 122% |
| Samprosoy 90NB | 15.47 | 145% |
| Profam 982 | 12.73 | 119% |
| Samprosoy 90MP | 11.86 | 111% |

EXAMPLE 10

Batches of soy white flakes were extracted and processed according to the method described in Example 1 while varying the pH during membrane filtration, the percent solids, the pH during UHT treatment, and the temperature during UHT treatment. Soy protein products 10.1 through 10.32 were processed according to the parameters listed in Table 10.

TABLE 10

|  | Membrane Filtration pH | % Solids | UHT pH | UHT Temp. (° F.) |
|---|---|---|---|---|
| 10.1 | 7.1 | 10 | 7.1 | 210 |
| 10.2 | 6.8 | 12 | 7.4 | 240 |
| 10.3 | 6.8 | 12 | 6.8 | 240 |
| 10.4 | 6.5 | 10 | 7.1 | 210 |
| 10.5 | 6.8 | 8 | 7.4 | 240 |
| 10.6 | 7.1 | 10 | 7.1 | 210 |
| 10.7 | 7.1 | 10 | 7.1 | 210 |
| 10.8 | 7.7 | 10 | 7.1 | 210 |
| 10.9 | 6.8 | 8 | 6.8 | 240 |
| 10.10 | 7.4 | 8 | 6.8 | 180 |
| 10.11 | 7.4 | 8 | 7.4 | 180 |

TABLE 10-continued

| | Membrane Filtration pH | % Solids | UHT pH | UHT Temp. (° F.) |
|---|---|---|---|---|
| 10.12 | 6.8 | 12 | 7.4 | 180 |
| 10.13 | 7.1 | 10 | 7.1 | 150 |
| 10.14 | 7.1 | 10 | 7.7 | 210 |
| 10.15 | 7.4 | 12 | 6.8 | 240 |
| 10.16 | 7.1 | 6 | 7.1 | 210 |
| 10.17 | 7.4 | 8 | 7.4 | 240 |
| 10.18 | 7.4 | 12 | 7.4 | 240 |
| 10.19 | 7.1 | 10 | 7.1 | 210 |
| 10.20 | 7.1 | 10 | 7.1 | 210 |
| 10.21 | 6.8 | 8 | 7.4 | 180 |
| 10.22 | 7.4 | 8 | 6.8 | 240 |
| 10.23 | 7.1 | 10 | 7.1 | 210 |
| 10.24 | 6.8 | 12 | 6.8 | 180 |
| 10.25 | 7.4 | 12 | 6.8 | 180 |
| 10.26 | 7.1 | 14 | 7.1 | 210 |
| 10.27 | 7.1 | 10 | 7.1 | 270 |
| 10.28 | 7.1 | 10 | 6.5 | 210 |
| 10.29 | 7.4 | 12 | 7.4 | 180 |
| 10.30 | 6.8 | 8 | 6.8 | 180 |
| 10.31 | | 15.5 | 7.2 | 175 |
| 10.32 | 7.7 | 10 | 7.1 | 210 |

Table 11 sets forth the gel strength, dispersion viscosity, ESI, percentage of protein having an apparent molecular weight greater than 300 kDa, and solubility of soy protein products 10.1 through 10.32.

TABLE 11

| | Gel Strength (N) | Viscosity (Nsm$^{-2}$) | ESI (mm) | MW >300 (%) | Solubility % |
|---|---|---|---|---|---|
| 10.1 | 0.722 | 0.396 | 65 | 72 | 70.01 |
| 10.2 | 0.323 | 0.317 | 90 | 46 | 69.42 |
| 10.3 | 0.412 | 0.371 | 84 | 40 | 62.71 |
| 10.4 | 0.316 | 0.365 | 78 | 42 | 61.33 |
| 10.5 | 0.312 | 0.278 | 88 | 74 | 74.47 |
| 10.6 | 0.446 | 0.408 | 80 | 50 | 79.51 |
| 10.7 | 0.587 | 0.408 | 50 | 61 | 82.95 |
| 10.8 | 0.549 | 0.557 | 49 | 23 | 70.63 |
| 10.9 | 0.274 | 0.307 | 78 | 55 | 67.04 |
| 10.10 | 0.308 | 0.295 | 77 | 53 | 68.6 |
| 10.11 | 0.53 | 0.337 | 70 | 72 | 74.05 |
| 10.12 | 0.445 | 0.415 | 74 | 11 | 81.74 |
| 10.13 | 0.303 | 0.277 | 82 | 52 | 70.33 |
| 10.14 | 0.552 | 0.424 | 71 | 58 | 70.89 |
| 10.15 | 0.399 | 0.382 | 96 | 60 | 66.24 |
| 10.16 | 0.482 | 0.414 | 86 | 61 | 60.04 |
| 10.17 | 0.430 | 0.328 | 81 | 67 | 65.67 |
| 10.18 | 0.525 | 0.508 | 71 | 53 | 65.25 |
| 10.19 | 0.577 | 0.461 | 56.5 | 64 | 68.79 |
| 10.20 | 0.557 | 0.381 | 77.0 | 67 | 72.51 |
| 10.21 | 0.400 | 0.351 | 78.0 | 6 | 65.67 |
| 10.22 | 0.373 | 0.354 | 71 | 29 | 69.84 |
| 10.23 | 0.351 | 0.343 | 68 | 40 | 70.58 |
| 10.24 | 0.408 | 0.354 | 72 | 52 | 70.28 |
| 10.25 | 0.409 | 0.364 | 63 | 50 | 71.03 |
| 10.26 | 0.563 | 0.516 | 83 | 34 | 58.08 |
| 10.27 | 0.287 | 0.405 | 80.5 | 2 | 51.40 |
| 10.28 | 0.263 | 0.347 | 69 | 26 | 60.63 |
| 10.29 | 0.46 | 0.411 | 53 | 50 | 69.43 |
| 10.30 | 0.281 | 0.324 | 65.5 | 49 | 70.01 |
| 10.31 | 0.509 | 0.412 | 71 | 37 | 75.1 |
| 10.32 | 0.611 | 0.480 | 51.3 | 8 | 64.2 |

ADDITIONAL ILLUSTRATIVE EMBODIMENTS

A description of a number of additional illustrative embodiments is provided below. The embodiments described are intended to illustrate the present materials and methods and are not intended to limit their scope.

A modified oilseed material may be formed that has at least about 85 wt. % (dsb) protein and an $MW_{50}$ of at least about 200 kDa. The modified oilseed material may further meet one or more additional criteria.

The modified oilseed material may also have a gel breaking strength of at least about 0.50 N and an ESI of no more than about 70 mm. The modified oilseed material may additionally have a solids profile of no more than about 11.00%.

The modified oilseed material may also have an NSI of at least about 80; at least about 1.4% cysteine as a percentage of total protein; a Gardner L value of at least about 85; and a substantially bland taste.

Another example is that the modified oilseed material may have a dispersion viscosity of at least about 0.30 Nsm$^{-2}$ and a final viscosity (at 11% solids) of at least about 0.50 Nsm$^{-2}$ after a heating and cooling cycle. Additionally, the modified oilseed material may have a final viscosity (at 11% solids) of at least about 0.45 Nsm$^{-2}$ after a heating and cooling cycle in the presence of 2% NaCl.

An additional example of a useful criterion is that the modified oilseed material may also have a dry Gardner L value of at least about 85. Additionally, the modified oilseed material may have an NSI of at least about 80.

Another example is that the modified oilseed material may include at least about 1.4 wt. % cysteine as a percentage of total protein. Additionally, the modified oilseed material may have a ratio of sodium ions to a total amount of sodium, calcium and potassium ions of no more than about 0.5.

An additional example is that the modified oilseed material may have no more than about 7000 mg/kg (dsb) sodium ions. The modified oilseed material may also have a substantially bland taste. Additionally, the modified oilseed material may comprise modified soybean material.

The modified oilseed material may be included in a food product at about 0.5 to 25 wt. % (dsb). The modified oilseed material may also comprises at least about 90 wt. % (dsb) protein. Additionally, the modified oilseed material may have a bacteria load of no more than about 50,000 cfu/g.

A modified oilseed material may be formed that can have at least about 85 wt. % (dsb) protein and at least about 40 wt. % of the protein in the modified oilseed material can have an apparent molecular weight of greater than 300 kDa. The modified oilseed material may further meet one or more additional criteria.

The modified oilseed material may also have a gel breaking strength of at least about 0.60 N and an ESI of no more than about 60 mm. The modified oilseed material may additionally have a solids profile of no more than about 11.00%.

The modified oilseed material may also have an NSI of at least about 80; at least about 1.4% cysteine as a percentage of total protein; and a Gardner L value of at least about 85.

Another example is that the modified oilseed material may have a dispersion viscosity (at 11% solids) of at least about 0.40 Nsm$^{-2}$ and a final viscosity (at 11% solids) of at least about 0.60 Nsm$^{-2}$ after a heating and cooling cycle. Additionally, the modified oilseed material may have a final viscosity (at 11% solids) of at least about 0.46 Nsm$^2$ after a heating and cooling cycle in the presence of 2% NaCl.

An additional example of a useful criterion is that the modified oilseed material may also have a dry Gardner L value of at least about 85. Additionally, the modified oilseed material may have an NSI of at least about 80.

An additional example is that the modified oilseed material may have no more than about 7000 mg/kg (dsb) sodium ions. The modified oilseed material may also have a substantially bland taste. Additionally, the modified oilseed material may comprise modified soybean material.

An additional example is that at least about 50% of the protein in a 10 mg sample of the modified oilseed material may be soluble in 1.0 mL water at 25° C.

A suitable modified oilseed material may have the additional characteristic that at least about 60% of the protein in a 10 mg sample of the modified oilseed material may also be soluble in 1.0 mL water at 25° C. More suitably, at least about 70% of the protein in a 510 mg sample of the modified oilseed material may also be soluble in 1.0 mL water at 25° C.

The modified oilseed material may be included in a food product at about 0.5 to 25 wt. % (dsb). The modified oilseed material may also comprises at least about 90 wt. % (dsb) protein. Additionally, the modified oilseed material may have a bacteria load of no more than about 50,000 cfu/g.

Another example is that the modified oilseed material may have a viscosity (at 12.5% solids) of at least about 0.50 $Nsm^{-2}$. Additionally, the modified oilseed material may have an $MW_{50}$ of at least about 400 kDa.

The modified oilseed material may be included in a food product at about 0.1 to 10 wt. %. The modified oilseed material may also comprises at least about 90 wt. % (dsb) protein. Additionally, the modified oilseed material may have a bacteria load of no more than about 50,000 cfu/g.

A modified oilseed material may be formed having at least about 85 wt. % (dsb) protein and at least about 40 wt. % of protein in the modified oilseed material can have an apparent molecular weight of greater than 300 kDa. The modified oilseed material may further have an $MW_{50}$ of at least about 200 kDa a gel breaking strength of about 0.50 N and a dispersion viscosity of at least about 0.40 $Nsm^{-2}$. The modified oilseed material may include at least about 90 wt. % (dsb) protein. Moreover, the modified oilseed material may comprise modified soybean material.

A modified oilseed material may be formed having at least about 85 wt. % (dsb) protein and at least about 40 wt. % of the protein in the modified oilseed material can have an apparent molecular weight of greater than 300 kDa. The modified oilseed material may further have an $MW_{50}$ of at least about 200 kDa and a gel breaking strength of at least about 0.50 N. The modified oilseed material may include at least about 90 wt. % (dsb) protein. Moreover, the modified oilseed material may comprise modified soybean material.

A modified soybean material may be formed having at least about 85 wt. % (dsb) protein and at least about 40 wt. % of the protein in the modified oilseed material can have an apparent molecular weight of greater than 300 kDa. The modified oilseed material may further have an $MW_{50}$ of at least about 200 kDa and a gel breaking strength of at least about 0.60 N. The modified oilseed material may include at least about 90 wt. % (dsb) protein. Moreover, the modified oilseed material may comprise modified soybean material.

A modified oilseed material may be formed having at least about 85 wt. % (dsb) protein and at least about 40 wt. % of the protein in the modified oilseed material can have an apparent molecular weight of greater than 300 kDa. The modified oilseed material may further have an $MW_{50}$ of at least about 200 kDa and a final viscosity of at least about 0.50 $Nsm^{-2}$ after a heating and cooling cycle. The modified oilseed material may also have a final viscosity of at least about 0.45 $Nsm^{-2}$ after a heating and cooling cycle in the presence of 2% NaCl. The modified oilseed material may include at least about 90 wt. % (dsb) protein. Moreover, the modified oilseed material may comprise modified soybean material.

A modified oilseed material may be formed having at least about 90 wt. % (dsb) protein and at least about 40 wt. % of the protein in the modified oilseed material can have an apparent molecular weight of greater than 300 kDa. The modified oilseed material may further have an $MW_{50}$ of at least about 200 kDa and an ESI of at least about 70 mm. The modified oilseed material may include at least about 90 wt. % (dsb) protein. Moreover, the modified oilseed material may comprise modified soybean material.

A modified oilseed material may be formed having at least about 90 wt. % (dsb) protein and at least about 40 wt. % of the protein in the modified oilseed material can have an apparent molecular weight of greater than 300 kDa. The modified oilseed material may further have an $MW_{50}$ of at least about 200 kDa and a solids profile of no more than about 11.00%. The modified oilseed material may include at least about 90 wt. % (dsb) protein. Moreover, the modified oilseed material may comprise modified soybean material.

A modified oilseed material may be formed by a process which includes extracting oilseed material with an aqueous alkaline solution to form a suspension of particulate matter in an oilseed extract and passing the extract through a filtration system including a microporous membrane to produce a permeate and a protein-enriched retentate. The microporous membrane may have a filtering surface with a contact angle of no more than about 30 degrees.

A modified oilseed material may also be formed by a process which includes extracting oilseed material at 20° C. to 60° C. with an aqueous solution having a pH of 7.5 to 10.0 to form a mixture of particulate matter in an alkaline extract solution, removing at least a portion of the particulate matter from the mixture to form a clarified extract, and passing the clarified extract at 55° C. to 60° C. through a filtration system to produce a permeate and a protein-enriched retentate. The filtration system may include a microporous modified polyacrylonitrile membrane. The microporous modified polyacrylonitrile membrane may have an MWCO of 25,000 to 500,000 and a filtering surface with a contact angle of no more than about 30 degrees.

It may be desirable for the contact time during extraction (i.e., the time period that the oilseed material is exposed to the aqueous solution) to be less that one hour. If a continuous, multistage process (e.g., a countercurrent extraction) is used, it may be advantageous for the apparent contact time (i.e., the average time period the oilseed material is exposed to the aqueous solution) to be no more than about one hour.

The process may further include diafiltering the protein-enriched retentate through the filtration system to produce a protein-containing diafiltration retentate. It may be advantageous to heat the diafiltration retentate to at least about 75° C. for a sufficient time to form a pasteurized retentate.

The present protein supplemented food compositions may include a modified oilseed material, which typically includes at least about 85 wt. % and, more desirably, at least about 90 wt. % protein on a dry solids basis.

The food composition can include a modified oilseed material which has an $MW_{50}$ of at least about 200 kDa, where the modified oilseed material has a gel breaking strength of at least about 0.50 N.

The food composition can include a modified oilseed material which has an $MW_{50}$ of at least about 200 kDa and a viscosity of at least about 0.50 $Nsm^{-2}$.

The food composition can include a modified oilseed material which has an $MW_{50}$ of at least about 200 kDa and has an ESI of no more than about 60 mm.

The food composition can include a modified oilseed material where at least about 40 wt. % of the protein in the modified oilseed material has an apparent molecular weight of at least 300 kDa and a gel breaking strength of at least about 0.60 N.

The food composition can include a modified oilseed material which has an $MW_{50}$ of at least 200 kDa and a final viscosity of at least about 0.50 $Nsm^{-2}$ after a heating and cooling cycle. The modified oilseed material may also have a final viscosity of at least about 0.45 $Nsm^{-2}$ after a heating and cooling cycle in the presence of 2% NaCl.

The food composition can include a modified oilseed material in which at least about 40 wt. % of the protein in the modified oilseed material has an apparent molecular weight of at least 300 kDa; a gel breaking strength of at least about 0.50 N; an ESI of no more than about 60 mm; and a viscosity of at least about 0.40 $Nsm^{-2}$.

The food composition can include a modified oilseed material which has a bacterial load of no more than 50,000 cfu/g.

The food composition can include a modified oilseed material which is produced by a process which includes: (a) extracting oilseed material with an aqueous alkaline solution to form a suspension of particulate matter in an oilseed extract; and (b) passing the extract through a filtration system including a microporous membrane to produce a permeate and a protein-enriched retentate. The microporous membrane commonly has a filtering surface with a contact angle of no more than 30 degrees.

The food composition can include a processed meat product, comprising meat, water and a modified soybean material which generally includes at least about 90 wt. % protein on a dry solids basis. The modified oilseed material can have an $MW_{50}$ of at least about 400 kDa and a gel breaking strength of at least about 0.50 N.

The food composition can include a meat analog comprising vegetable-based materials (e.g., extruded vegetable proteins and starches), water and a modified oilseed material which generally includes at least about 90 wt. % protein on a dry solids basis. The modified oilseed material can have an $MW_{50}$ of at least about 400 kDa and a gel breaking strength of at least about 0.50 N.

The food composition can include a sauce (e.g., a cheese or cream sauce) comprising dairy-based materials (e.g., cheese, milk fat), water and a modified oilseed material which generally includes at least about 90 wt. % protein on a dry solids basis. The modified oilseed material can have an $MW_{50}$ of at least about 400 kDa and a gel breaking strength of at least about 0.50 N.

The food composition can be a dressing (e.g., mayonnaise-like dressings), and can include oils, water and a modified soybean material which generally includes at least about 90 wt. % protein on a dry solids basis. The modified oilseed material can have a $MW_{50}$ of at least about 400 kDa and a gel breaking strength of at least about 0.50 N.

A method for producing a modified oilseed material may include extracting oilseed material with an aqueous solution to form a suspension of particulate matter in an oilseed extract, and passing the extract through a filtration system including a microporous membrane to produce a first permeate and a protein-enriched retentate, wherein the microporous membrane has a filtering surface with a contact angle of no more than 30 degrees. The method for producing a modified oilseed material may also include a UHT treatment and drying procedure carried out at a pH of about 7.0 to 7.8.

In a suitable embodiment, the method for producing a modified oilseed material may include a UHT treatment carried out at a pH of about 7.1 to 7.7.

More suitably, the method for producing a modified oilseed material may include a UHT treatment carried out at a pH of about 7.2 to 7.4.

In a suitable embodiment, the microporous membrane may have a pore size of no more than 1.5µ.

In another suitable embodiment, the clarified extract may be passed through the filtration system under a transmembrane pressure of no more than 50 psig.

In another suitable embodiment, the first permeate may be separated with a reverse osmosis membrane into an RO retentate and an RO permeate.

In another suitable embodiment, the extract may be passed through the filtration system at 55° C. to 60° C.

In another suitable embodiment, the protein-enriched retentate is diafiltered through the filtration system to produce a diafiltration retentate and a diafiltration permeate.

In a particularly suitable embodiment, the first permeate and the diafiltration permeate may be combined to form a combined permeate, and the combined permeate may be separated with a reverse osmosis membrane into an RO retentate and an RO permeate.

In another suitable embodiment, diafiltering the protein-enriched retentate includes diluting the protein-enriched retentate with an aqueous diluent which includes the RO permeate.

In another suitable embodiment, the RO permeate may be recirculated into the aqueous solution for extracting the oilseed material.

In another suitable embodiment, the oilseed material may be extracted with an aqueous alkaline solution to form the suspension.

In another suitable embodiment, the aqueous alkaline solution has a pH of about 6.5 to 10.0.

In another suitable embodiment, passing the extract through the filtration system comprises first passing an original volume of the extract through the filtration system while adding water to the extract in a feed tank so as to substantially maintain the original volume, and second passing the extract through the filtration system while allowing the retentate to be concentrated by a factor of at least 2.5 relative to the original volume.

In another suitable embodiment, the retentate may be heated at a pH of about 7.0 to 7.8 for a sufficient time to form a pasteurized retentate.

In another suitable embodiment, the retentate may be heated at a pH of about 7.1 to 7.7 for a sufficient time to form a pasteurized retentate. More suitably, the retentate may be heated at a pH of about 7.2 to 7.4 for a sufficient time to form a pasteurized retentate.

In another suitable embodiment, the retentate may be heated to at least about 200° F. to 250° F. for a sufficient time to form a pasteurized retentate.

In another suitable embodiment, the retentate may be heated to about 210° F. to 240° F.

In yet another suitable embodiment, the retentate may be heated for about 2 to 30 seconds to form a pasteurized retantate.

In yet another suitable embodiment, the retentate may be heated for about 5 to 20 seconds to form a pasteurized retentate.

In another suitable embodiment, the pasteurized retentate may be dried.

A method for producing an oilseed protein product may include extracting oilseed material with an aqueous alkaline solution to form an alkaline suspension of particulate matter in an oilseed extract, and passing the extract through a filtration system including a microporous membrane to produce a first permeate and a protein-enriched retentate, heating the protein-enriched retentate at a pH of about 7.0 to 7.8 for a sufficient time to form a pasteurized retentate, and drying the pasteurized retentate.

In another suitable embodiment, the protein-enriched retentate is heated to a temperature of no more than about 220° F.

In another suitable embodiment, the pasteurized retentate is dried at a pH of about 7.0 to 7.8.

In another suitable embodiment, protein-enriched retentate is pasteurized at a pH of about 7.1 to 7.7.

In another suitable embodiment, the pasteurized retentate is dried at a pH of about 7.1 to 7.7.

In another suitable embodiment, protein-enriched retentate is pasteurized at a pH of about 7.2 to 7.4.

In another suitable embodiment, the pasteurized retentate is dried at a pH of about 7.2 to 7.4.

In another suitable embodiment, protein-enriched retentate is pasteurized at a pH of about 7.3.

In another suitable embodiment, pasteurized retentate is dried at a pH of about 7.3.

In another suitable embodiment, the microporous membrane has a filtering surface with a contact angle of no more than 30 degrees.

In another suitable embodiment, the microporous membrane has a filtering surface with a contact angle of no more than 40 degrees.

The invention has been described with reference to various specific and illustrative embodiments and techniques. However, it should be understood that many variations and modifications may be made while remaining within the spirit and scope of the invention.

What is claimed is:

1. A modified oilseed material comprising at least about 85 wt. % (dsb) protein; wherein at least about 40 wt. % of the protein has an apparent molecular weight of greater than 300 kDa; the modified oilseed material has a gel breaking strength of at least 0.50 N; and the modified oilseed material has an ESI of no more than about 70 mm.

2. A modified oilseed material comprising at least about 85 wt. % (dsb) protein; wherein the modified oilseed material has an $MW_{50}$ of at least about 200 kDa; the modified oilseed material has a dispersion viscosity of at least about 0.5 $Nsm^{-2}$; and the modified oilseed material has an ESI of no more than about 70 mm.

3. A modified oilseed material comprising at least about 85 wt. % (dsb) protein; wherein the modified oilseed material has an $MW_{50}$ of at least about 200 kDa; and the modified oilseed material has an ESI of no more than about 70 mm.

4. A modified oilseed material comprising at least about 85 wt. % (dsb) protein; wherein the modified oilseed material has an $MW_{50}$ of at least about 200 kDa; a gel breaking strength of at least 0.50 N; and the modified oilseed material has an ESI of no more than about 70 mm.

5. The modified oilseed material of claim 4 wherein the modified oilseed material has a gel breaking strength of at least 0.60 N.

6. The modified oilseed material of claim 4 wherein the modified oilseed material has a dispersion viscosity of at least about 0.4 $Nsm^{-2}$.

7. The modified oilseed material of claim 4 wherein the modified oilseed material has an ESI of no more than about 60 mm.

8. The modified oilseed material of claim 4 wherein the modified oilseed material has an NSI of at least 80.

9. The modified oilseed material of claim 4 wherein at least about 40 wt. % of the protein has an apparent molecular weight of greater than 300 kDa.

10. The modified oilseed material of claim 4 wherein the modified oilseed material has a bacterial load of no more than 50,000 cfu/g.

11. The modified oilseed material of claim 4 comprising a flavor component content including no more than about 500 ppb benzaldehyde; no more than about 2500 ppb 2-pentyl furan; no more than about 600 ppb 2-heptanone; and no more than about 200 ppb E,E-2,4-decadienal.

12. The modified oilseed material of claim 4 comprising a flavor component content which includes no more than about 350 ppb benzaldehyde; no more than about 450 ppb 2-heptanone; no more than about 150 ppb E,E-2,4-decadienal; and no more than about 50 ppb E,E-2,4-nonadienal.

13. The modified oilseed material of claim 4 wherein the modified oilseed material comprises modified soybean material.

14. The modified oilseed material of claim 4 wherein the modified oilseed material comprises at least about 90 wt. % (dsb) protein.

15. A modified oilseed material produced by a process which includes extracting oilseed material with an aqueous solution to form an oilseed extract; passing the extract through a filtration system including a microporous membrane to produce a permeate and a protein-enriched retentate; heating the protein-enriched retentate to a temperature of about 200-250° F. at a pH of about 7.1 to 7.7 for 9 to 15 seconds to form a pasteurized retentate; and spray drying the pasteurized retentate;
wherein the modified oilseed material comprises at least about 85 wt. % (dsb) protein; wherein the modified oilseed material has an $MW_{50}$ of at least about 200 kDa; the modified oilseed material has a dispersion viscosity of at least about 0.5 $Nsm^{-2}$; and the modified oilseed material has an ESI of no more than about 70 mm.

16. A food composition comprising a modified oilseed material, wherein the modified oilseed material comprises at least 85 wt. % protein on a dry solids basis; at least about 40 wt. % of the protein has an apparent molecular weight of at least 300 kDa; the modified oilseed material has a gel breaking strength of at least 0.50 N; and the modified oilseed material has an ESI of no more than about 70 mm.

17. The food composition of claim 16 wherein the food composition is a processed meat composition.

18. The food composition of claim 16 wherein the food composition is a sauce, soup or dressing.

19. A modified oilseed material comprising at least about 90 wt. % (dsb) protein; wherein the modified oilseed material has an $MW_{50}$ of at least about 200 kDa; the modified oilseed material has a gel breaking strength of at least 0.50 N; the modified oilseed material has an NSI of at least 80; and the modified oilseed material has an ESI of no more that about 60 mm.

20. The modified oilseed material of claim 19 wherein the water content of the modified oilseed material is no more than about 10 wt. %; and the modified oilseed material has an average particle size of no more than about 200 microns.

21. The modified oilseed material of claim 20 wherein the modified oilseed material has an average particle size of about 50 to 150 microns.

* * * * *